US012585927B2

(12) United States Patent
Trivedi et al.

(10) Patent No.: US 12,585,927 B2
(45) Date of Patent: Mar. 24, 2026

(54) INTEGRATED MEMORY SYSTEM FOR HIGH PERFORMANCE Bayesian AND CLASSICAL INFERENCE OF NEURAL NETWORKS

(71) Applicant: THE BOARD OF TRUSTEES OF THE UNIVERSITY OF ILLINOIS, Urbana, IL (US)

(72) Inventors: Amit Ranjan Trivedi, Chicago, IL (US); Theja Tulabandhula, Chicago, IL (US); Priyesh Shukla, Chicago, IL (US); Ahish Shylendra, Chicago, IL (US); Shamma Nasrin, Chicago, IL (US)

(73) Assignee: THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 1321 days.

(21) Appl. No.: 17/292,067

(22) PCT Filed: Nov. 13, 2019

(86) PCT No.: PCT/US2019/061277
§ 371 (c)(1),
(2) Date: May 7, 2021

(87) PCT Pub. No.: WO2020/102421
PCT Pub. Date: May 22, 2020

(65) Prior Publication Data
US 2021/0397936 A1 Dec. 23, 2021

Related U.S. Application Data

(60) Provisional application No. 62/760,778, filed on Nov. 13, 2018.

(51) Int. Cl.
G06F 17/18 (2006.01)
G06G 7/16 (2006.01)
(Continued)

(52) U.S. Cl.
CPC ............. *G06N 3/063* (2013.01); *G06F 17/18* (2013.01); *G06G 7/16* (2013.01); *G06N 3/047* (2023.01)

(58) Field of Classification Search
CPC G06G 7/16; G06N 3/04; G06N 3/045; G06N 3/047; G06N 3/063; G06N 3/065;
(Continued)

(56) References Cited

U.S. PATENT DOCUMENTS

| | | | |
|---|---|---|---|
| 8,112,755 B2 | 2/2012 | Apacible et al. | |
| 8,175,981 B2 | 5/2012 | Hawkins et al. | |

(Continued)

FOREIGN PATENT DOCUMENTS

| | | |
|---|---|---|
| CN | 105007176 A | 10/2015 |

OTHER PUBLICATIONS

International Search Report dated Mar. 12, 2020 in copending PCT Application No. PCT/US2019/061277 filed Nov. 13, 2019.
(Continued)

*Primary Examiner* — Andrew Caldwell
*Assistant Examiner* — Huy Duong
(74) *Attorney, Agent, or Firm* — Thomas I Horstemeyer, LLP

(57) ABSTRACT
A memory module system for a high-dimensional weight space neural network configured to process machine learning data streams using Bayesian Inference and/or Classical Inference is set forth. The memory module can include embedded high speed random number generators (RNGs). The memory module is configured to compute, store and sample neural network weights by adapting operating pre-
(Continued)

cision to optimize the computing effort based on available weight space and application specifications.

6 Claims, 22 Drawing Sheets

(51) Int. Cl.
 *G06N 3/047* (2023.01)
 *G06N 3/063* (2023.01)
(58) Field of Classification Search
 CPC ..... G06N 3/08; G06F 15/7821; G06F 15/785;
 G06F 7/58; G06F 7/582; G06F 7/588;
 G06F 17/15; G06F 17/153; G06F 17/16;
 G11C 11/419; G11C 11/54; G11C 7/1006
 See application file for complete search history.

(56) References Cited

U.S. PATENT DOCUMENTS

| | | | | |
|---|---|---|---|---|
| 8,219,507 | B2 | 7/2012 | Jaros et al. | |
| 10,380,386 | B1 * | 8/2019 | Strachan | G06G 7/16 |
| 11,645,493 | B2 * | 5/2023 | Burger | G06N 3/04 |
| | | | | 706/23 |
| 2015/0006455 | A1 * | 1/2015 | Suri | G06N 3/049 |
| | | | | 706/32 |
| 2015/0106315 | A1 | 4/2015 | Birdwell et al. | |
| 2015/0242745 | A1 | 8/2015 | Wang et al. | |
| 2018/0174025 | A1 * | 6/2018 | Jin | G06N 3/065 |
| 2018/0321913 | A1 | 11/2018 | Gilbert et al. | |
| 2019/0043560 | A1 * | 2/2019 | Sumbul | G11C 11/419 |
| 2020/0042287 | A1 * | 2/2020 | Chalamalasetti | G06N 3/065 |
| 2021/0034947 | A1 * | 2/2021 | Wang | G11C 7/222 |
| 2021/0117792 | A1 * | 4/2021 | Ahuja | G06N 3/045 |
| 2021/0150323 | A1 * | 5/2021 | Turek | G06N 3/063 |
| 2022/0044719 | A1 * | 2/2022 | Li | G06N 3/065 |
| 2022/0051078 | A1 * | 2/2022 | Gong | G06N 3/049 |
| 2022/0067491 | A1 * | 3/2022 | Vengertsev | G11C 16/10 |
| 2022/0319162 | A1 * | 10/2022 | Rangachar Srinivasa | |
| | | | | G06V 10/82 |
| 2023/0185252 | A1 * | 6/2023 | Lee | G05B 13/027 |
| | | | | 700/37 |

OTHER PUBLICATIONS

Sandberg et al., "A Palimpsest Memory Based on an Incremental Bayesian Learning Rule," Neurocomputing 32-33 (2000) 987-994.
Chakrapani et al.,"Ultra-Efficient (Embedded) SOC Architectures Based on Probabilistic CMOS (PCMOS) Technology", Center for Research on Embedded Systems and Technology, Georgia Institute of Technology, Atlanta, GA, pp. 1110-1115, 3-9810801-0-6/DATE06, 2006, EDAA.

* cited by examiner

31

33

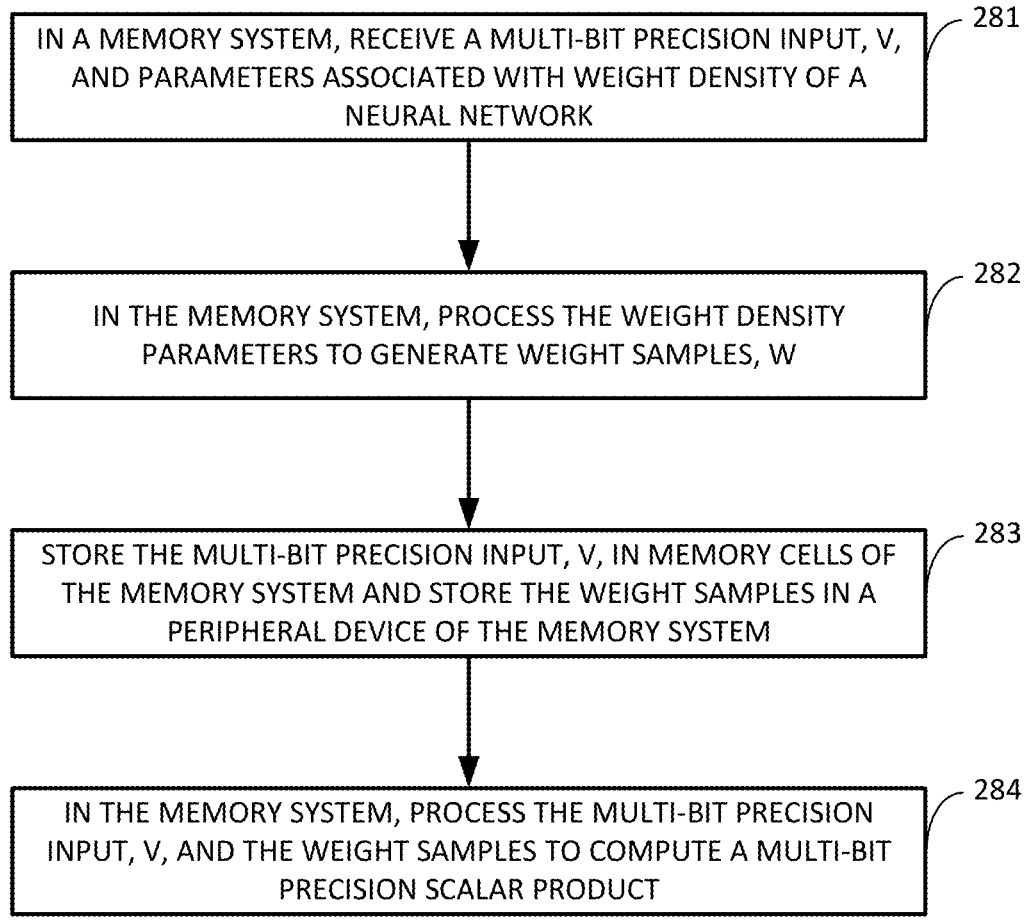

IN A MEMORY SYSTEM, RECEIVE A MULTI-BIT PRECISION INPUT, V, AND PARAMETERS ASSOCIATED WITH WEIGHT DENSITY OF A NEURAL NETWORK ⟋ 281

IN THE MEMORY SYSTEM, PROCESS THE WEIGHT DENSITY PARAMETERS TO GENERATE WEIGHT SAMPLES, W ⟋ 282

STORE THE MULTI-BIT PRECISION INPUT, V, IN MEMORY CELLS OF THE MEMORY SYSTEM AND STORE THE WEIGHT SAMPLES IN A PERIPHERAL DEVICE OF THE MEMORY SYSTEM ⟋ 283

IN THE MEMORY SYSTEM, PROCESS THE MULTI-BIT PRECISION INPUT, V, AND THE WEIGHT SAMPLES TO COMPUTE A MULTI-BIT PRECISION SCALAR PRODUCT ⟋ 284

FIG. 28

INTEGRATED MEMORY SYSTEM FOR HIGH PERFORMANCE Bayesian AND CLASSICAL INFERENCE OF NEURAL NETWORKS

CROSS-REFERENCE TO RELATED APPLICATIONS

The present application is a nonprovisional U.S. national phase application that claims the benefit of, and priority to, PCT international application No. PCT/US2019/061227 filed on Nov. 13, 2019 and entitled "INTEGRATED MEMORY SYSTEM FOR HIGH PERFORMANCE BAYESIAN AND CLASSICAL INFERENCE OF NEURAL NETWORKS", which claims the benefit of, and priority to, the filing date of U.S. provisional application Ser. No. 62/760,778, filed on Nov. 13, 2018 and entitled "INTEGRATED MEMORY SYSTEM FOR HIGH PERFORMANCE BAYESIAN AND CLASSICAL INFERENCE OF NEURAL NETWORKS," both of which are incorporated by reference herein in their entireties.

BACKGROUND

Machine learning (ML) platforms are proliferating into safety/security-critical domains such as, for example, self-driving cars, drones, surgical robotics, cryptography, etc., where inference methods, even if computationally expensive, are imperative. Currently, classical inference methods that employ deterministic learning weights are used in these types of ML platforms. Consequently, these ML platforms are only designed to operate with deterministic variables. ML platforms that operate with deterministic variables cannot express their prediction confidence. By not capturing the uncertainty in inputs and modelling, deterministic ML platforms are thereby susceptible to high decision risk and thus are unsuited for safety/security-critical platforms.

Additionally, edge-analytics of data is becoming prevalent for real-time applications, such as those used in safety/security-critical platforms. An "edge" refers to the computing infrastructure close to the source of data. For example, processors embedded in wind turbines, cell-phones, traffic lights, etc., are edge devices that perform edge-analytics processes close to the source of the data. For ML, while training can still be done on a cloud platform, inference using edge platforms minimizes or eliminates the network latency that otherwise appears in cloud-based inference.

A need exists for an ML platform that can be implemented in an edge device with high efficiency and with improved prediction accuracy over that which is currently achievable in ML platforms that operate with deterministic variables.

SUMMARY

In accordance with exemplary embodiments, memory module systems for a high-dimensional weight space neural network are configured to process machine learning data streams using Bayesian Inference and/or Classical Inference. In an embodiment, the memory module system can include a memory module having embedded high speed random number generators (RNGs) within the module. The memory module can be configured to compute, store and sample neural network weights by adapting operating precision to optimize the computing effort based on available weight space and application specifications.

In another embodiment the memory module system can include an SRAM array. The memory module system can further include at least one scalar product port. Yet another exemplary embodiment of the system has a memory module including an edge processing device.

In accordance with the principles herein, another exemplary embodiment of the memory module system can further include at least one peripheral digital to analog converter (DAC) operatively connected to a multiplicand buffer and to a row current of an integrated memory array, such as an SRAM array, wherein the row current provides a current-mode AND gate for the DAC. The memory module system can further include a mapping device for mapping GMM density computations onto the SRAM array. Additionally, the memory module system mapping device can further include a calibrating loop. Further, a density read of the memory module can be varied based on a density determination computed via the mapping device.

Still another exemplary embodiment constructed in accordance with the principles herein includes an edge processing device. The edge processing device includes an integrated memory array (IMA) configured to combine Bayesian and/or Classical inference processing, high dimensional statistical data storage, and high speed sampling from the statistical data. At least one scalar product port can be operatively connected to the IMA.

Another memory module system constructed in accordance with the principles herein can include an SRAM array. At least one peripheral digital to analog converter (DAC) can be operatively connected to a multiplicand buffer and to a row current of the SRAM array. The row current provides a current-mode AND gate for the DAC. The SRAM array can be configured for scalar product computation within the array to determine statistical density storage. The memory module can include high speed random number generators (RNGs) for sampling that are embedded in the SRAM array, or operatively connected thereto.

An embodiment of a throughput processing module in an edge processing device can include a mapping device for mapping GMM density computations onto an integrated memory array (IMA). The computing component can be configured to compute a density weight of a GMM candidate within the IMA operatively connected to the mapping device. The throughput processing module can include a suitable integrated memory array, such as an SRAM array, where the computing device can be embedded within the SRAM array.

The exemplary throughput processing module can include high speed RNGs to generate a random vector R, wherein the computing component can be configured to receive a candidate weight sample $w^{cand}$ defined as $R+w^i$ from a past output $w^i$. $w^{cand}$, the density weight acceptable in the system if the computation $GMM(w^{cand})/GMM(w^i)$ is more than U, where U is generated Uniformly between zero and one, and $GMM(w^{cand})$ and $GMM(w^i)$ are read within memory array, and where the throughput processing module can be operatively connected to or incorporate within the module a mapping device for mapping GMM density computations onto the SRAM array.

In accordance with another embodiment, a machine learning (ML) memory system is provided comprising a solid-state memory array. The solid-state memory array comprises a plurality of memory cells and one or more peripheral devices. At least one of the peripheral devices is a shared resource of the memory cells of the solid-state memory array. The solid state memory array is configured to perform an ML algorithm that: receives a multi-bit precision input, V, and parameters associated with weight density of a neural network; processes the weight density parameters to generate weight samples, W; stores the multi-bit precision input V in said one or more peripheral devices and the weight sample W in the memory cells; and processes the weight samples W and input V to compute a multi-bit precision scalar product.

In accordance with an embodiment, the ML algorithm performs Bayesian Inference (BI) and the weights are statistical densities. In accordance with an embodiment, the statistical densities are Gaussian mixture model (GMM) densities.

In accordance with another embodiment, the solid-state memory array of the ML memory system further comprises RNGs embedded in the solid-state memory array and formed using transistors of the solid-state memory array. The RNGs generate random numbers that are used to sample the GMM densities using Markov chain Monte Carlo-based weight sampling.

In accordance with another embodiment, the one or more peripheral devices of the ML memory system include: a multiplicand buffer that stores the multi-bit precision input V; a DAC that converts the multi-bit precision input V stored in the multiplicand buffer into an analog value and applies the analog value to the memory cells to generate the weight samples and to compute a current-mode analog scalar product; and an analog-to-digital converter (ADC) that samples the current-mode analog scalar product to convert the current-mode analog scalar product into the multi-bit precision scalar product. In accordance with an embodiment, the DAC is self-calibrating. In accordance with an embodiment, the DAC converts the multi-bit precision input V into a current vector that the ML algorithm causes to be transformed to a scalar product appearing as analog current in the columns of the solid-state memory array.

In accordance with an embodiment, the solid-state memory array of the ML memory system is a static random access memory (SRAM) array that operates in a column-wise parallel mode to achieve high-throughput processing, and operates in current-mode to decouple a potential impact of process variability in SRAM cells on an accuracy of the scalar product.

These and other features and advantages will become apparent from the following description, drawings and claims.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

FIG. 28 is a flow diagram representing the method in accordance with a representative embodiment.

DETAILED DESCRIPTION

Figure 1:
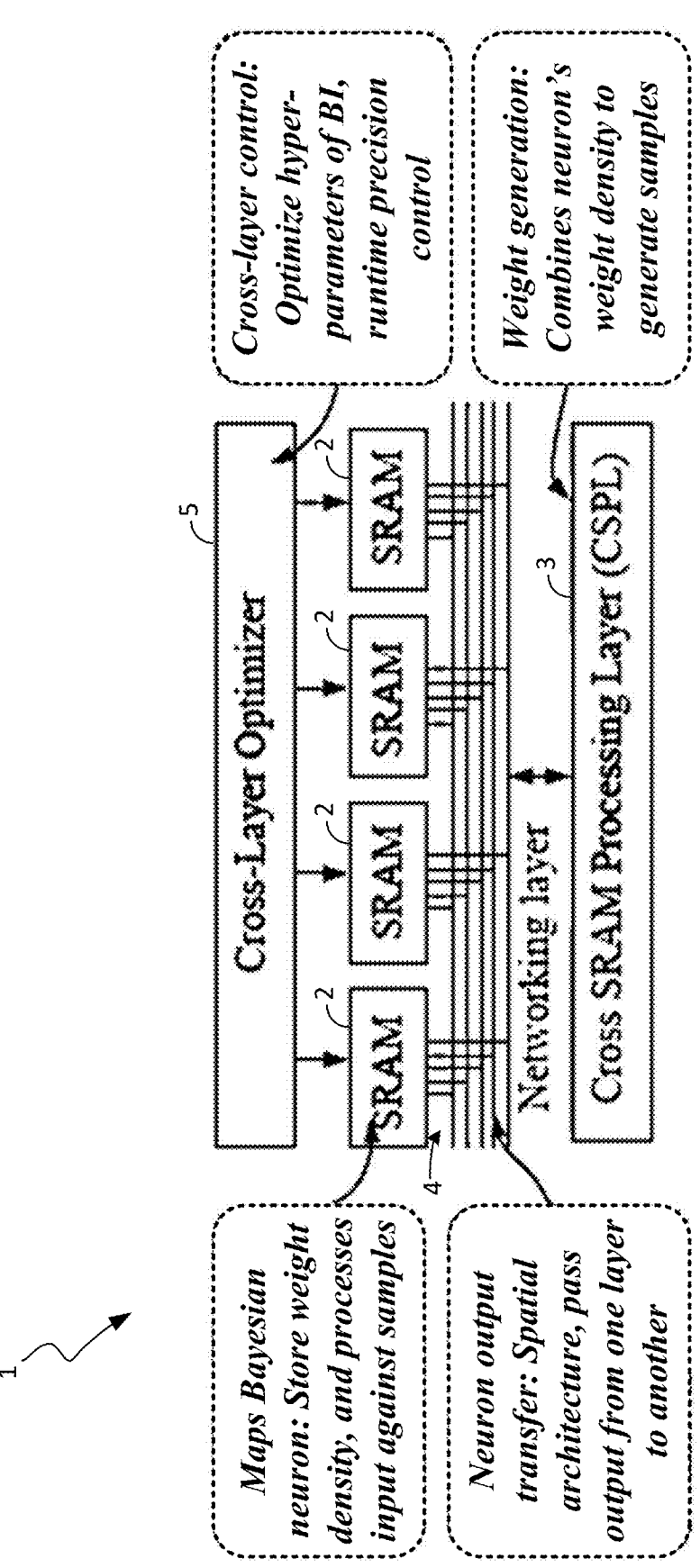
FIG. 1 is a block diagram of the ML system in accordance with a representative embodiment in which all BI operations are implemented within an SRAM array.

The present disclosure discloses an ML platform and method that can be implemented in an edge device for efficient real-time data processing with improved prediction accuracy. In accordance with a preferred embodiment, the ML platform employs Bayesian inference (BI) instead of classical inference (CI). BI considers many explanations of a training set, which improves the prediction accuracy, despite limited training data. Unlike CI, BI expresses the prediction confidence, which makes BI especially well-suited for safety/security-critical domains. For example, in self-driving cars, BI can express the confidence of prediction when faced with unfamiliar input, such as 'Green light' with 70% confidence, as opposed to simply 'Green light' in CI. As a result of this expression of prediction confidence, employing BI in the ML platform allows it to avoid making potentially-risky decisions.

However, BI also substantially differs from CI in that it uses statistical densities as learning weights rather than the deterministic weights used in CI. This creates implementation challenges for conventional platforms, which are typically only designed to operate with deterministic (and not statistical) variables. The ML platform disclosed herein is capable of meeting such challenges and is also being capable of being implemented in a highly-efficient edge device for performing real-time data analytics with high prediction accuracy.

A few representative embodiments of the diagnostic tool and method will now be described with reference to FIGS. 1-28, in which like reference numerals represent like components, elements or features. It should be noted that features, elements or components in the figures are not intended to be drawn to scale, emphasis being placed instead on demonstrating inventive principles and concepts. It should be noted that the inventive principles and concepts are not limited to the representative embodiments described herein, as will be understood by those of skill in the art in view of the description provided herein.

In the following detailed description, for purposes of explanation and not limitation, exemplary, or representative, embodiments disclosing specific details are set forth in order to provide a thorough understanding of inventive principles and concepts. However, it will be apparent to one of ordinary skill in the art having the benefit of the present disclosure that other embodiments according to the present teachings that are not explicitly described or shown herein are within the scope of the appended claims. Moreover, descriptions of well-known apparatuses and methods may be omitted so as not to obscure the description of the exemplary embodiments. Such methods and apparatuses are clearly within the scope of the present teachings, as will be understood by those of skill in the art. It should also be understood that the word "example," as used herein, is intended to be non-exclusionary and non-limiting in nature.

The terminology used herein is for purposes of describing particular embodiments only, and is not intended to be limiting. The defined terms are in addition to the technical, scientific, or ordinary meanings of the defined terms as commonly understood and accepted in the relevant context.

The terms "a," "an" and "the" include both singular and plural referents, unless the context clearly dictates otherwise. Thus, for example, "a device" includes one device and plural devices. The terms "substantial" or "substantially" mean to within acceptable limits or degrees acceptable to those of skill in the art. The term "approximately" means to within an acceptable limit or amount to one of ordinary skill in the art.

In accordance with the principles of the present disclosure, computing, sampling and storing (CSS) memory system(s), or platforms, are set forth that not only efficiently store statistical variables, but also operate on the statistical variables for both high-speed BI and CI computations. Moreover, the memory system(s) of the present disclosure can be implemented in conventional CMOS technologies, allowing the memory system(s) to be mass-produced with minimal development steps and to be suitable for integration with new designs as well as legacy designs that are used in conventional technologies. Further, the memory system(s) incorporate structures such that most of computing operations of BI can be integrally performed within the memory system(s). As a result, the memory system(s) improve cost-effectiveness of the ML platforms by obviating the need for one or more high-speed processing engine(s).

In accordance with the inventive principles and concepts of the present disclosure, memory platform(s) for BI are set forth where individual memory cells of the platform can: (i) compute the output of statistical machine learning algorithm within memory, (ii) store and read very high dimensional statistical weight densities, and (iii) learn statistical weight densities in runtime and dynamically, while maintaining a compact cell size, low energy of operation, high performance, and compatibility with conventional technologies.

Closely knitting different functional layers of BI, namely, storage, sampling, and computing, within an individual simplified memory cell array can also result in contention for resources among the layers of an array for resources. In accordance with a preferred embodiment, the memory system(s) of the present disclosure incorporates techniques to dynamically adapt the layer configuration to optimize the efficiency and throughput of operation. The disclosure presents a fundamental memory platform for advanced data stream computing and storage where individual memory arrays coalesce storage and computing, while also performing both deterministic and statistical operations. By containing computations within the memory platform, the memory facilitates non von Neumann execution for decision making in many applications such as, for example, self-driving cars, drones, surgical robots, and cryptography, which may require faster, lower-power, and/or real-time processing.

Moreover, memory platform(s) constructed in accordance with inventive principals and concepts disclosed herein address efficient execution of complex (but practical) problems dealing with various degrees of uncertainties in input patterns, training data, and application requirements by locally and dynamically learning the statistical densities of uncertainties.

Exemplary embodiments constructed in accordance with the inventive principles and concepts disclosed herein advance the science of inference at the edge computing platforms by enabling a BI within the constrained resources of the platform. As indicated above, BI uses statistical densities as weights to improve the prediction accuracy despite limited training data. Unlike CI, BI can express the confidence of prediction and overcome limitations of CI, such as overfitting. However, by considering statistical densities as weights, BI also incurs a tremendous movement of data between memory and processing units that results in a higher latency and energy dissipation for real-time applications on edge devices. The present disclosure addresses the problem at its core by enabling, in certain embodiments, static random access memory (SRAM) in the platforms to map scalable BI within the memory so that access to separate processing units is not needed. To map BI within SRAM, embodiments constructed in accordance with the principles herein such as CMOS-based SRAM cells, initially designed for digital storage alone, can be configured, in accordance with the principles disclosed herein, for: (i) computing multi-bit precision scalar product, (ii) storing and reading statistical densities, and (iii) sampling stored statistical densities, while maintaining a compact cell size, low energy of operation, and high performance, and for other advantageous resource sharing and system efficiencies. At the system-level, interaction and design trade-offs of different computing layers of BI in SRAM are set forth.

ML algorithms have demonstrated that the growing volume and variety of data, faster computing power, and efficient storage can be leveraged for highly accurate predictions and decision-making in complex computing problems. Consequently, ML is currently an integral component of computational imaging, speech processing, spam filtering, etc. While the first-generation ML platforms were generally confined to static models, in the second generation, ML gains momentum towards real-time applications. Real-time applications require dynamic decision-making based on the evolving inputs; thus, they require ML models to predict with the least latency. The predictive robustness of ML models also becomes critical since actions are taken immediately based on the prediction. Some of the real-time applications of ML are autonomous vehicles, surgical robots, personal assistants, and internet-of-things. For the predictive robustness of ML, many current approaches prefer BI over CI in neural networks because BI can rigorously account for the model uncertainties. Inference is a computing approach that a neural network takes for the predictions. For BI, neural networks use statistical densities as weights rather than point estimates in CI. Using the statistical densities, a BI considers many explanations of a training set that improves the prediction accuracy despite limited training data. Predictions in BI are also statistical and express the prediction confidence of the network.

Nonetheless, BI is also computationally demanding. Many weight scenarios are drawn in BI from the weight densities, and predictions on all scenarios are combined. Meanwhile, CI considers just one weight scenario. Therefore, the computations in BI are also proportionally more than CI. Additionally, edge-analytics of data is becoming prevalent for real-time applications where the data is processed using the edge devices close to the source. For ML, while training can still be done on a cloud platform, inference using edge platforms minimizes or eliminates the network latency that otherwise appears in cloud-based inference. Edge processing also reduces the burden on the centralized nodes and provides a clear path to scaling real-time analytics. However, edge resources also tend to be much more limited than cloud, which has the virtually infinite capacity.

Noting the above two trends, increasing complexity of inference and push towards edge-analytics with limited resources, a gap between the necessary workload and available resources is also apparent. Embodiments constructed in accordance with inventive principles and concepts disclosed herein aim to fill the gap between the necessary workload and available resources using several exemplary embodiments that provide solutions to the network resource needs of several system applications. Specifically, one of the key factors that limits the efficiency of inference is a high-volume transfer of weights and intermediate operands between memory and processing units. While the inefficiencies due to high-volume data movement are already significant for CI, they escalate in BI since not only many weight scenarios are considered, but also storage and sampling from high-dimensional statistical densities is required.

Exemplary embodiments disclosed herein address these limitations by providing a memory module that can both efficiently store and compute to minimize the latency and energy dissipation in repeatedly moving the high-volume data. Additionally, an exemplary design is disclosed that uses conventional CMOS technology for an implementation that is low cost, near-term, and compatible with the other processing units. In particular, SRAM cells, which are initially intended for digital storage alone, are used to store and read statistical weight densities, generate statistical weight samples from the weight densities, and operate input pattern against weight samples to generate probabilistic outputs of a BI. These advancements equip SRAM to execute most of the computations for a BI within, thus obviating the need for access processing units.

The exemplary embodiment of an SRAM focuses on a SRAM-based BI in feed-forward networks (FFNs) since BI-based training methods have been shown for FFNs. A recent digital accelerator for BI only supports Gaussian approximation to the weight densities. Since the weight densities can be multimodal, a Gaussian approximation is often inadequate. In accordance with an exemplary embodiment, the densities are implemented with greater flexibly by using a Gaussian mixture model (GMM). With enough mixture components, a GMM can model any density arbitrarily closely. Compared to the digital implementations of GMM in other known solutions, the exemplary memory configuration disclosed herein can read GMM density in the memory itself. Prior works show that the memory access energy can dominate the overall energy in data-intensive operations (e.g., more energy in reading from SRAM than multiplication in 45 nm CMOS). By performing computations deep within memory, the exemplary embodiment is more scalable for BI and high-dimensional density reads. Compared to in-memory CI, a current mode processing technique is disclosed herein that can be used to minimize the impact of memory cell variability to the quality of computation. Therefore, the memory cells do not pose limitations for technology scaling. At the system-level, the exemplary embodiment opportunistically reduces precision, adapts to a hybrid sampling mode, and determines the efficient mapping of neurons on SRAM, and explores physical design and operating power space considering interaction of computing layers of BI. Other systems designed to achieve the same computational abilities are contemplated within the scope of the present disclosure.

The inventive principles and concepts disclosed herein advance inference capabilities of edge devices by coalescing storage and computing within suitable memory systems, such as SRAM, for example, in the platforms where SRAM also performs operations for both deterministic and statistical nature. A simplified SRAM cell that can be designed and manufactured using conventional process technologies (e.g., CMOS processes) is disclosed herein, although it should be noted that custom modules can be designed in accordance with the inventive principles and concepts disclosed herein. The inventive principles and concepts disclosed herein enable particular goals to be achieved, such as analyzing, characterizing, and optimizing the complex functional and physical interactions between computing components and models. Some of the core principles disclosed herein include reliable storage-computing under process imperfections by maneuvering dynamic and spatial variability of SRAM arrays to integrate storage and computing reliably.

Statistical operations such as storing and sampling from high-dimensional statistical densities are performed in the memory system, such as, for example, an SRAM system. Collectively with the ML algorithm(s), the platform disclosed herein can be expanded to scalable learning and manipulation of weight densities of BI within the memory system, such as an SRAM system, for example. It should be noted, however, that while inventive principles and concepts disclosed herein are disclosed herein with reference to SRAM, the inventive principles and concepts are equally applicable to other types of memory elements and systems, as will be understood by those of skill in the art in view of the description provided herein. For example, other solid-state memory systems such as, for example, flash memory, dynamic random access memory (DRAM), non-volatile memory devices such as resistive memory (RRAM), spin transfer torque memory (STT-RAM), and phase change memory (PC-RAM), could be configured in accordance with the inventive principles and concepts disclosed herein.

Exemplary embodiments disclosed herein achieve low operand mobility in data-intensive inference. Operand mobility can be minimized in data-intensive inference by controlling data flow, operating within memory, co-locating functional units, and co-processing digital and mixed-signal computing modes.

Physical design and operating power space for Bayesian inference: the principles disclosed herein provide approaches to understand the system-level physical design and operating power space of BL Techniques to optimally allocate resources, i.e., area and power among storage, sampling, and computing layers are set forth herein.

Dynamic cross-layer adaptation: the principles disclosed herein provide approaches to understand and exploit the dynamic interaction of the layers of BI. A cross-layer adaptation is orchestrated by dynamically modulating precision and controlling sampling mode. In BI, various quantities of interest are computed by the integrals. For example, the Expectation of the outcome is known by $\int M(V,W) \times P(W|D)dW$ where $M(V,W)$ is the neural network model for input V and $P(W|D)$ is the posterior density of weights W on the training data D. Since the integrals are often intractable, numerical approaches simplify them by sampling and summation. The posterior density can be estimated as $q(W)$ by Variational Inference (VI). Thus, the Expectation reduces to $$\int M(V, W)P(W \mid D)dW = \frac{1}{N} \times \sum\nolimits_{j=1}^{N} M(V, w_{q(w)}) \qquad (1)$$

Here, $w_{q(W)}$ is an independent and identically distributed weight sample drawn from $q(W)$. The law of large number guarantees an asymptotic convergence of the summation to the exact integral as N increases.

From Eq. (1), if one considers mapping BI on conventional inference platforms (such as dedicated ASIC, GPU-based, or even memristor-based), many complexities of BI are unaddressed. For example, BI requires storing the posterior density of weights $q(W)$ and generate samples from the density. The dimension of $q(W)$ is the same as the total number of weights in a neural network, which can be, for example, ~100 to 10,000 in even a moderate sized network. A high throughput sampling and computing is also necessary for an adequately high N in Eq. (1). Augmenting CI platforms with a dedicated density storage and sampling unit will still incur immense traffic of high-dimensional weight samples. Therefore, a new platform constructed in accordance with the inventive principles and concepts disclosed herein is beneficial for BI in order to cohesively integrate density storage, sampling, and computing within a single platform.

FIG. 1 is a block diagram of the ML memory system 1 in accordance with a representative embodiment in which all BI operations are implemented within an array of SRAM devices 2. A neuron of the neural network can be folded and mapped to one or many exemplary memory platforms, such as an SRAM array, for example, depending on its input dimension. The SRAM devices 2 of the array store the parameters of the neuron's weight density. The SRAM devices 2 also generate weight samples within. At each weight sample, the SRAM devices 2 compute the scalar product of input with weight sample. Generating weight samples within the same SRAM device 2 of the array that computes their scalar product saves energy. A cross-SRAM processing layer (CSPL) 3 collects the scalar product and applies activation transformation to determine a neuron's output. The output of a neural network layer (Y) is given as $$Y = f(V \times W) \qquad (2)$$

Here, V is applied input to neural network layer, W is weight of neural network (in BI, weight samples are generated based on the corresponding statistical density functions while in CI weights are point estimates), and $f( )$ is activation function (such as sigmoid or rectified linear unit). Activation transformation generates the output of neural network layer. Since the size of a neural network layer can be much larger than the size of the SRAM array, this approach allows mapping arbitrary larger scale neural network layers in multiple SRAM arrays. The SRAM devices 2 can communicate using a networking layer 4. A cross-layer optimizer 5 maps neurons on the SRAM devices 2 of the array to minimize the data movement. Since a neural network has predetermined communication flow among neurons, the optimal mapping can be determined offline and executed during compilation. In runtime, the cross-layer optimizer 5 modulates operation precision and controls sampling hyper-parameters.

Detailing the platform, the design of SRAM arrays can be arranged to process a weight sample against an input pattern. Weight density storage in SRAM arrays and weight sampling using CSPL is disclosed herein. System-level aspects are also addressed herein. Validation plans and risk mitigation are also disclosed herein.

Figure 2:
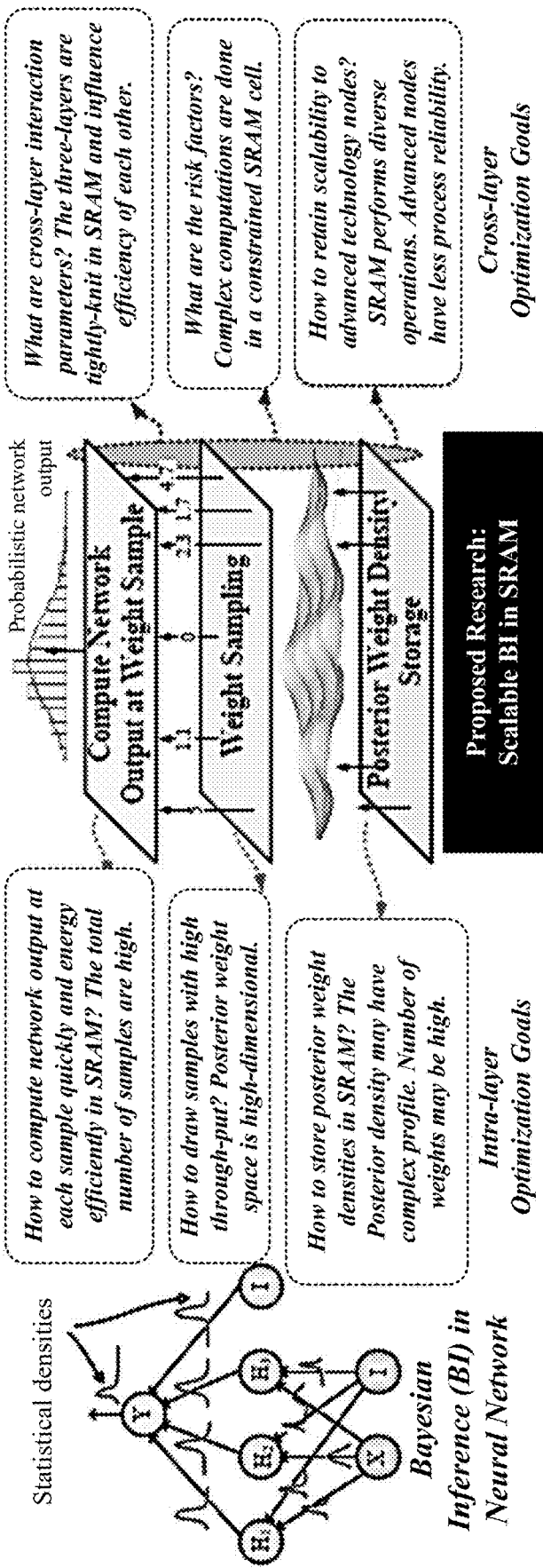
FIG. 2 is a pictorial illustration of the computing layer design of the ML memory system shown in FIG. 1 in accordance with a representative embodiment.

FIG. 2 is a pictorial illustration of the computing layer design of the ML memory system 1 shown in FIG. 1 in accordance with a representative embodiment. The computing layer design is utilized for multibit-precision scalar product. In accordance with an embodiment, the ML memory system 1 is configured to perform a high-throughput scalar product using simplified memory cells and peripherals. The cells and peripherals are designed in the advanced memory nodes, such as CMOS nodes, where process variability aggravates. For BI, neural networks use statistical densities as weights rather than point estimates used in CI. Predictions in BI are also statistical and express the prediction confidence of the network. Many weight scenarios are drawn in BI from the weight densities, and predictions on all scenarios are combined. To accelerate these operations, the SRAM array performs statistical density storage and sampling. The SRAM array provides a suitable computation model for computing the scalar products. Generally, a machine learning model is comprised of many processing layers. Each processing layer performs scalar product of applied input against its weight matrix and transforms the output using an activation function to generate the layer output. The layer output is then applied to the subsequent machine learning layer which likewise processes it using its own weight matrix. Such layer by layer processing of the machine learning algorithm transforms an applied input (for example, image of traffic signals) to an action or label (for example, car action to go). The discussed scheme corresponds to the processing of any of the layers of the complete ML algorithm. All layers can be likewise mapped to the SRAM array. Thus, the discussed techniques are applicable to any larger scale machine learning algorithm. In accordance with an embodiment, SRAM cells and random number generators (RNGs) are combined in the ML memory system 1 for sampling, as will be described below in more detail.

Figure 3:
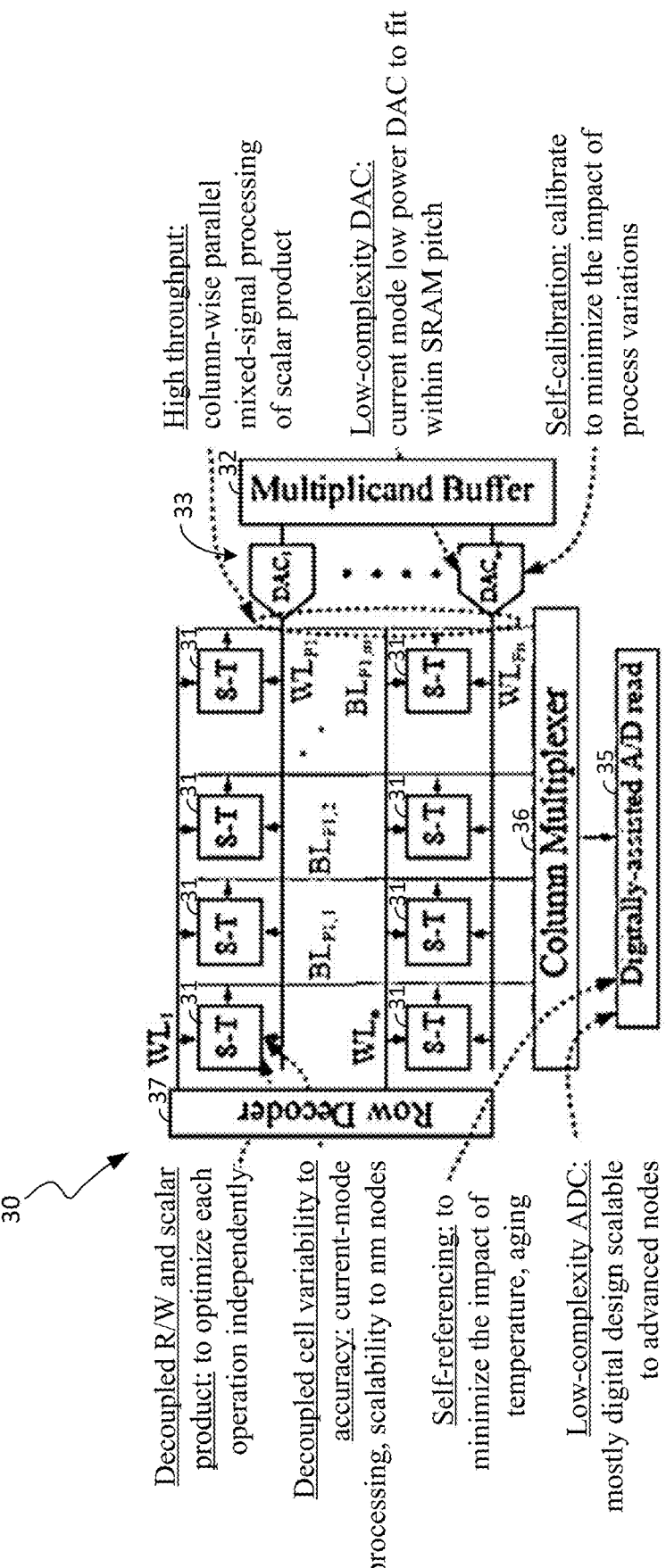
FIG. 3 is a block diagram of the SRAM array shown in FIG. 1 in accordance with a representative embodiment in which the SRAM array is configured to obtain a multibit-precision scalar product.

FIG. 3 is a block diagram of the SRAM array shown in FIG. 1 in accordance with a representative embodiment in which the SRAM array is configured to obtain a multibit-precision scalar product. In accordance with this embodiment, the SRAM array 30 comprises an array of 8-transistor (T) SRAM cells 31. For the scalar product of V·W, V is stored in the SRAM cells 31 and W is copied to a multiplicand buffer 32. W is converted to the corresponding analog-mode current vector $I^W$ using a digital-to-analog converter (DAC) array 33. The basic approach for the scalar product is to use the SRAM cells 31 as current-mode AND gates. If an SRAM cell 'j' stores '1', it allows row DAC current $I^W_j$ to flow to its bitline. Otherwise, the current is blocked. An ADC 35 at the bottom reads the current of SRAM columns storing multibit-precision V, and determines V·W in accordance with timing control provided by a column multiplexer (MUX) 36. A row decoder 37 addresses the SRAM cells 31 to control writing of the analog-mode current vector to the SRAM cells 31.

Some of the key features of this embodiment include: (i) the SRAM array operates in a column-wise parallel mode for a high-throughput processing, (ii) the current-mode operation of the SRAM array decouples the impact of process variability in SRAM cells to the accuracy of the scalar product, (iii) the SRAM cells decouple read/write with the scalar product so that the scalar product does not interfere with the typical operation of cells, (iv) the array uses low-complexity mostly digital peripherals so that the design is scalable to advanced CMOS nodes, (v) the peripherals in the array self-calibrate, and (vi) the column peripherals use self-referencing to minimize temperature/aging impact.

Known memory systems have computed in-memory scalar product. For example, a single-bit output precision scalar product using a six-transistor (6-T) SRAM cell has been performed. Although keeping the cell design to the simplest, the scalar product obtained in the 6-T SRAM cell is sensitive to the threshold voltage (VTH) variability in memory cell transistors, which cannot be controlled reliably for compact memory cells at advanced CMOS nodes. Meanwhile, the design shown in FIG. 3 can be implemented using current-mode processing where exemplary SRAM cells 31 either act as a current buffer or block the input current so that the variability in cell transistors has a minimal impact to the accuracy of a scalar product.

Other embodiments can include, for example, a row-wise parallel multi-bit precision scalar product using 10-T SRAM cells. The design operates by pre-charging the bitlines to the operand potential and then averaging the bitline potentials by charge sharing. Although the design achieves good stability to VTH variability, the voltage mode operation and analog peripheral increase the complexity to supply voltage scaling. The embodiment shown in FIG. 3 achieves a better dynamic range using current-mode processing, even at a low supply voltage of the array. Pulse-width modulated wordline signals can be used for the scalar product, but suppressing the impact of process variability requires on-chip learning. However, on-chip learning of BI, especially for the networks of many hidden layers, significantly complicates the implementation by requiring a higher precision platform for reliable gradient computations.

Figure 4:
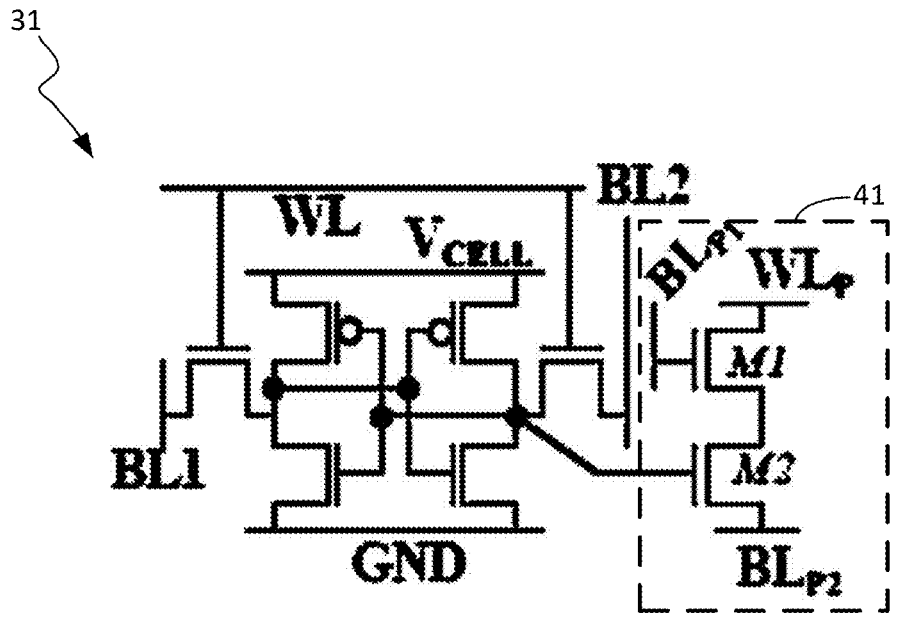
FIG. 4 is a schematic diagram of an 8-transistor (T) cell of the SRAM array shown in FIG. 3 in accordance with a representative embodiment having an additional scalar product port.

FIG. 4 is a schematic diagram of one of the 8-T cells of the SRAM array 31 shown in FIG. 3 in accordance with a representative embodiment having an additional scalar product port.

The primary challenge for the mixed-signal scalar product is to tackle the process variability at advanced CMOS nodes. Increasing complexity or area of SRAM cells can improve the functional accuracy of the scalar product, but limits the memory density and energy efficiency. In accordance with an embodiment, this challenge is met by decoupling the variability in SRAM cells to the accuracy of scalar product and by relying on the robustness of the peripherals alone. The peripherals self-calibrate to improve precision. By limiting the complexity to peripherals alone, memory cells can be compact and energy efficient.

Figure 5:
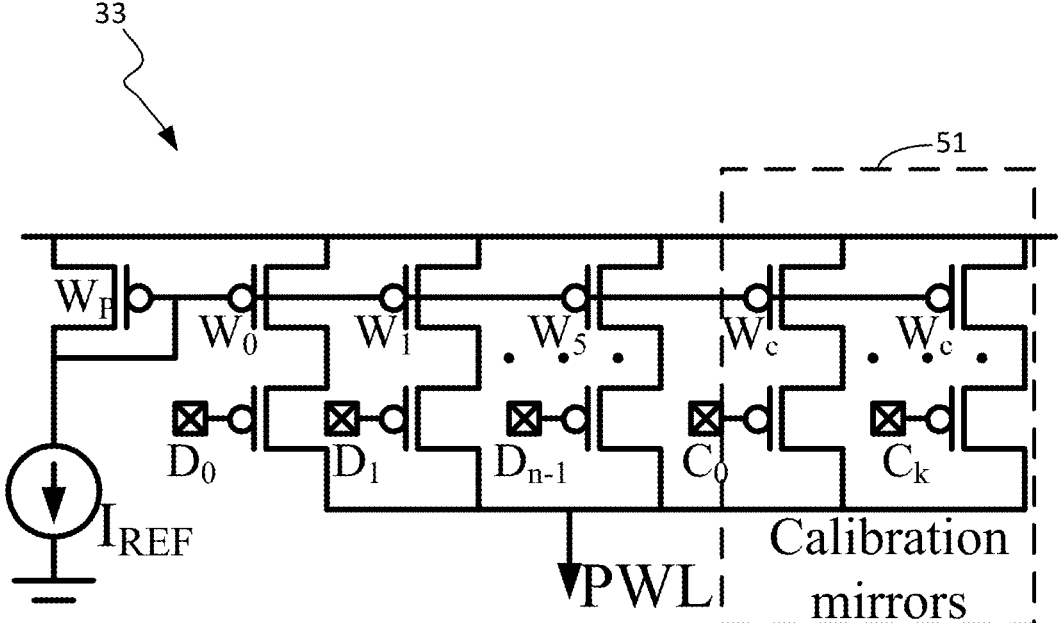
FIG. 5 is a schematic diagram of a digital-to-analog converter (DAC) that converts a multiplicand to an equivalent analog current and applies it to a product wordline of the cells shown in FIG. 4.
Figure 6:
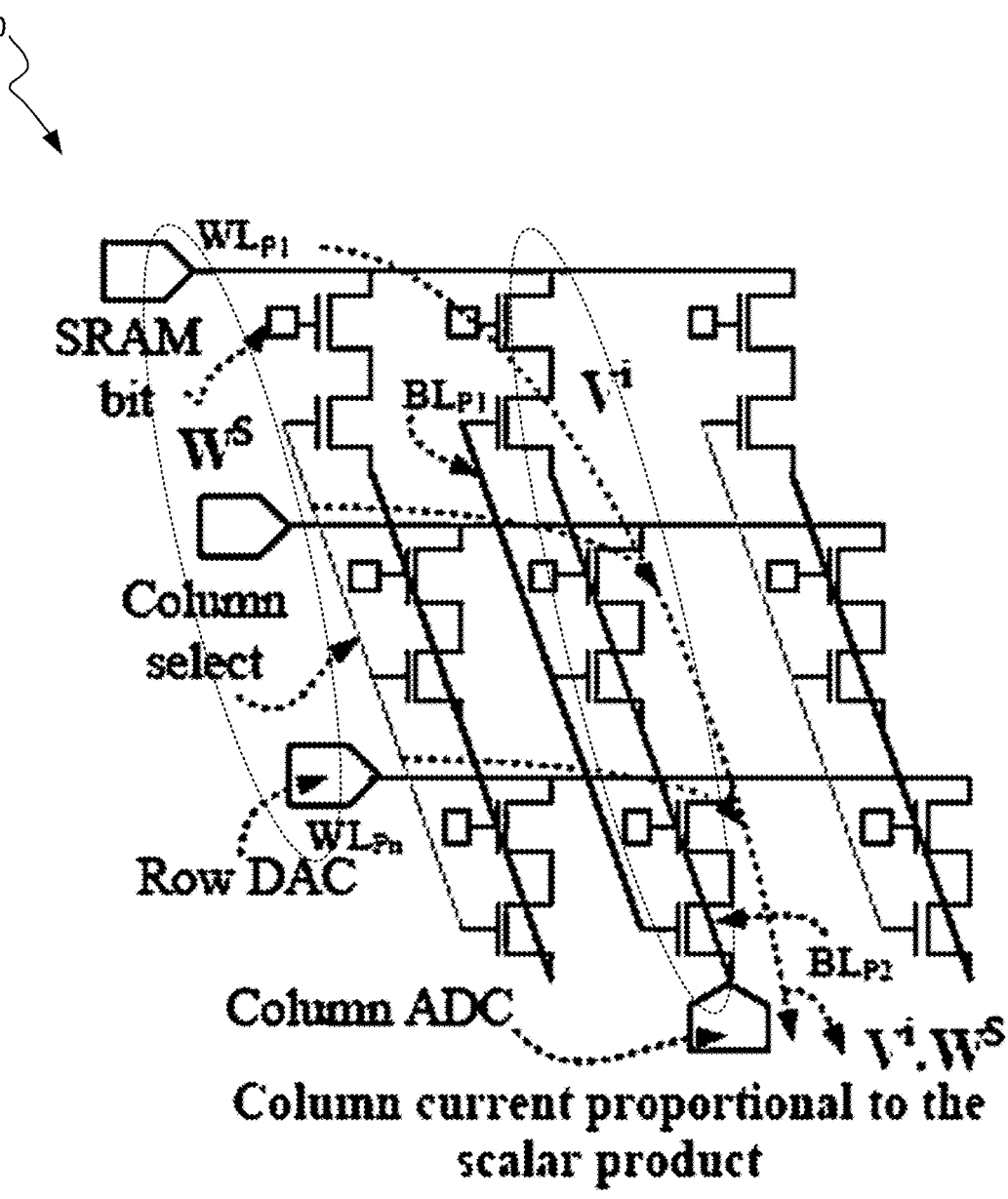
FIG. 6 is a schematic diagram of an analog-to-digital converter (ADC) that converts the column current of a wordline of the cells shown in FIG. 4 to digital bits.

FIG. 5 is a schematic diagram of the DACs 33 shown in FIG. 3. The 8-T SRAM cell 31 operates as a current-mode AND gate and has an additional scalar product port 41. The DAC 33 converts a multiplicand to equivalent analog current $I^W_j$ and applies it to the product wordline $WL_P$ of the additional scalar product port 41. The SRAM columns store the other multiplicand V in n-columns for n-bit precision. FIG. 6 is a schematic diagram of the SRAM array 30 and demonstrates the manner in which the scalar product is obtained. The current of each column follows Vi·W in FIG. 6. The ADC 35 (FIG. 3) converts the column current into digital bits. The current of all n-columns storing various precision bits of V are converted using the ADC 35 and combined with digital scaling to compute V·W. The array first computes V·W$^+$ for the positive weights in W and then for the negative weights W$^-$.

Figure 7:
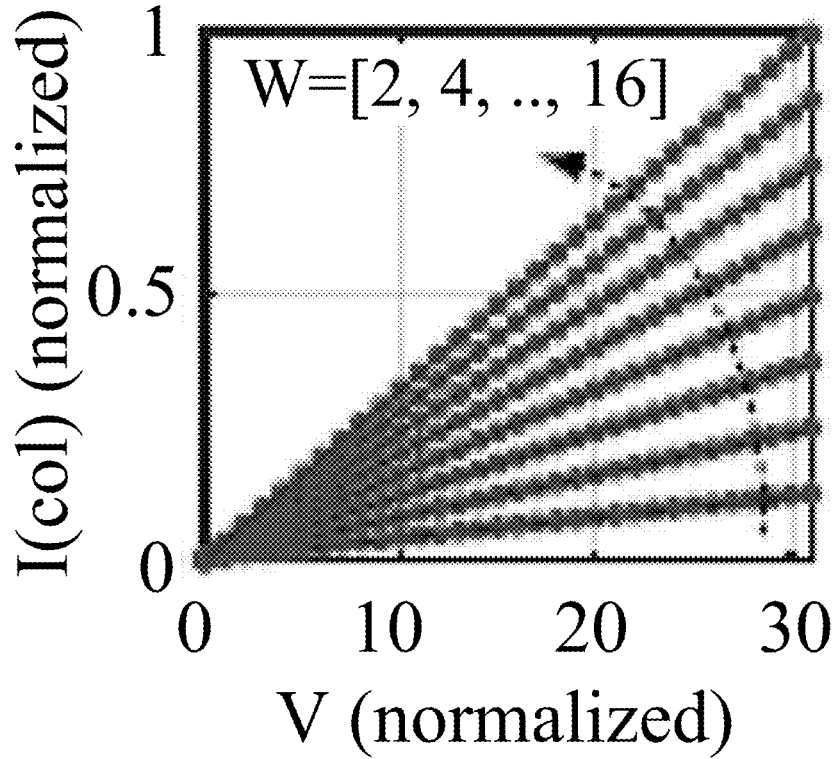
FIG. 7 is a plot of the scalar product obtained by performing HSPICE simulation using 32×64 SRAM cells in the SRAM array 30 shown in FIG. 3.
Figure 8:
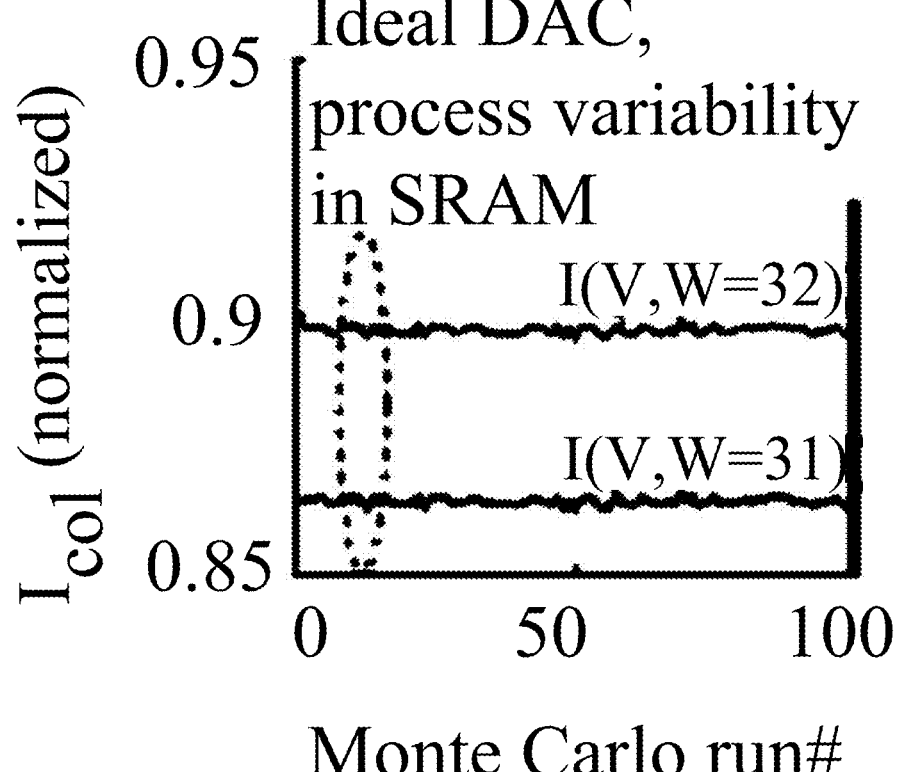
FIG. 8 is a plot of a number of Monte Carlo simulation runs performed using 32×64 SRAM cells in the SRAM array shown in FIG. 3, and demonstrates the effect of VTH variability in SRAM cell transistors to scalar product current ($\sigma$(VTH)=25 mV).

FIG. 7 is a plot of the scalar product obtained by performing HSPICE simulation using 32×64 SRAM cells in the SRAM array 30 shown in FIG. 3. FIG. 8 is a plot of a number of Monte Carlo simulation runs performed using 32×64 SRAM cells in the SRAM array shown in FIG. 3, and demonstrates the effect of VTH variability in SRAM cell transistors to scalar product current ($\sigma$(VTH)=25 mV). It can be seen in FIG. 8 that, due to the current-mode input/output to the SRAM cells, VTH variability of cell transistors does not affect the scalar product when DAC currents are much greater than SRAM leakage.

The next challenge is to understand the interplay between non-idealities in peripherals and accuracy of the scalar product. Additionally, the complexity of peripherals should be minimized to scale to advanced CMOS nodes with a minimal exemplary design effort. A simplified current mirror-based DAC in FIG. 4(*b*) can be selected to operate many units in parallel without excessive power and to fit each within the pitch of an SRAM row.

Figure 9:
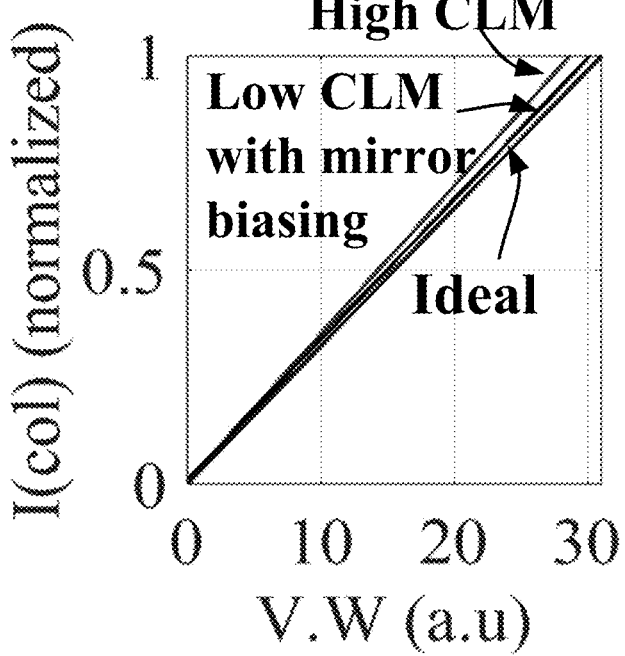
FIG. 9 is a plot of column current as a function of voltage demonstrating the effect of channel length modulation (CLM) in mirroring transistors of the DAC shown in FIG. 5.

However, the DAC 33 shown in FIG. 5 displays two critical non-idealities that affect the scalar product accuracy: (i) dependence on $WL_P$ potential due to channel length modulation (CLM) in the mirroring transistors and (ii) non-ideal mirroring ratio due to process variability. To address CLM in the transistors of the DAC 33, the turn-ON voltage of select switches in DAC 33 is reduced to limit source-to-drain voltage of mirroring transistors, which improves the accuracy. FIG. 9 is a plot of column current as a function of voltage demonstrating the effect of CLM in the mirroring transistors of the DAC 33. Sophisticated (yet, area/power-expensive) current mirror DAC designs are known that maximize output impedance of current mirror addressing CLM. For example, a feedback modulated current mirror DAC design has been employed to improve matching accuracy under CLM. In principle, the feedback circuit can be shared among many current mirrors. Therefore, the overheads can be amortized.

To address the challenge of non-ideal mirroring ratio due to process variability, a set of calibrating transistors 51 with small width $W_C$ relative to the mirroring transistors can be added to the DAC 33, as shown in FIG. 5. A calibrating transistor can be added to a mirroring transistor if, due to process variability, its width is less than required. For simplicity, the calibrating solution is only additive. Thus, each transistor can be designed for the worst-case mirroring ratio using $W_i=M_i\times(W_P-\Delta W_P)-\Delta W_i$, where $M_i$ is the mirroring ratio, $\Delta W_P$ and $\Delta W_i$ are the worst-cases of process variability in the reference and mirroring transistors. For calibration, the DAC mirror current is read against a reference to add $W_C$ until the current meets the desired level.

Another challenge in designing an exemplary system in accordance with the inventive principles and concepts disclosed herein is to inhabit mixed-signal peripherals in the spatially- and temporally-varying environment of SRAM. SRAM operates at a high frequency that induces power supply variations. In accordance with an embodiment, this challenge is met by dynamically modulating the supply voltage and clock frequency depending on the system and application-level constraints.

Figure 10:
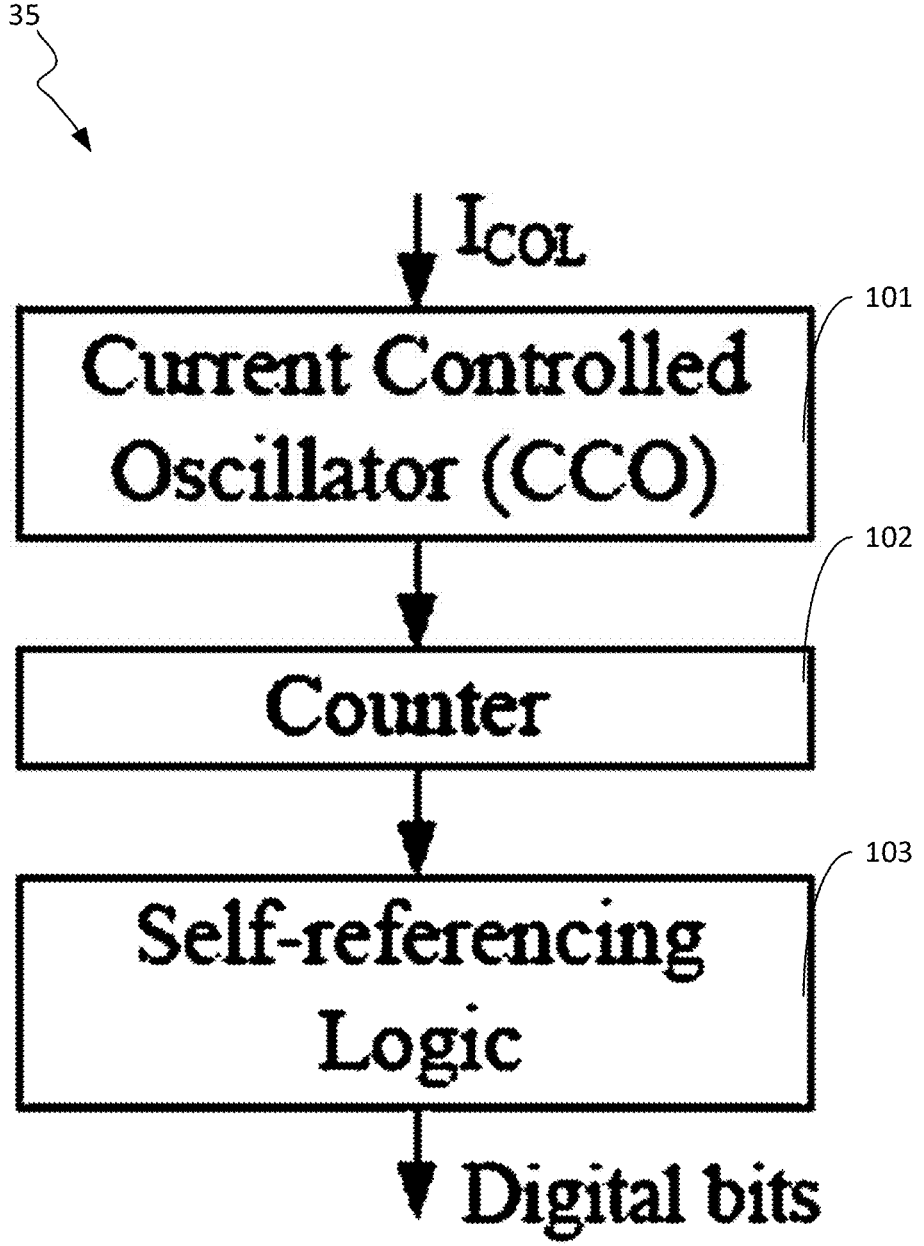
FIG. 10 is a flow diagram of the processes performed by the ADC shown in FIG. 3 in accordance with a representative embodiment.

Due to a high density of cells, temperature also varies spatially and dynamically in SRAM. A reliable operation of mixed-signal peripherals can be configured in the dynamic environment of SRAM using self-referencing and mostly digital peripherals. FIG. 10 is a flow diagram of the processes performed by the components of the ADC 35 shown in FIG. 3 in accordance with a representative embodiment. This approach to ADC uses a current-controlled oscillator (CCO) 101, a counter 102, and self-referencing logic 103. The ADC operates by current-to-time conversion. The CCO 101 oscillates to a frequency proportional to the magnitude of the column current, which depends on the scalar product of applied input V and weight sample W generated within memory. The oscillation frequency of the CCO 101 is captured by the digital counter 102, which thereby converts analog current to corresponding digital bits, thereby performing analog to digital conversion of the analog current mode scalar product. Selecting a simplified exemplary ADC having the components shown in FIG. 10 is supported by two factors: (i) BI follows the inference paradigm where many sub-models are combined. Meanwhile, at low precision, the utility of complex ADCs such as SAR and algorithmic is limited, (ii) The alternative ADCs rely on components such as analog comparators and capacitive DAC, which creates challenges in co-locating them with SRAM.

Figure 11:
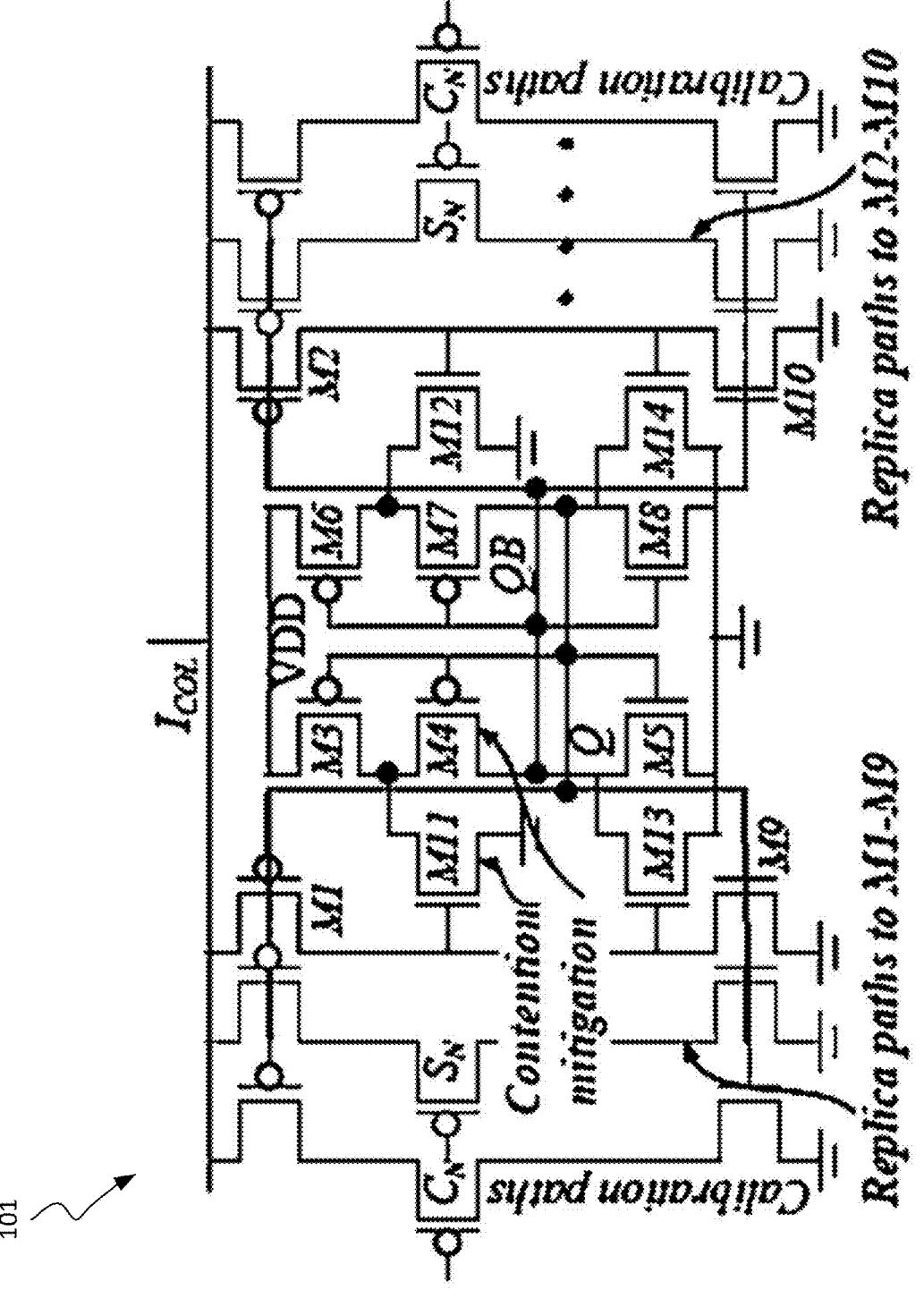
FIG. 11 is a schematic diagram of a current-controlled oscillator (CCO) of the ADC shown in FIG. 3 in accordance with a representative embodiment.

In contrast, FIG. 11 shows a schematic diagram of the CCO 101 in accordance with a representative embodiment that can be implemented in SRAM or some other type of memory. The CCO 101 forces $I_{COL}$ to either M1 or M2 depending on Q and QB potential. It should be noted that the CCO capabilities can be extended to the subthreshold mode by modifying the CCO 101 with enhancements for resolving pull-up/down contention.

Figures 12, 13:
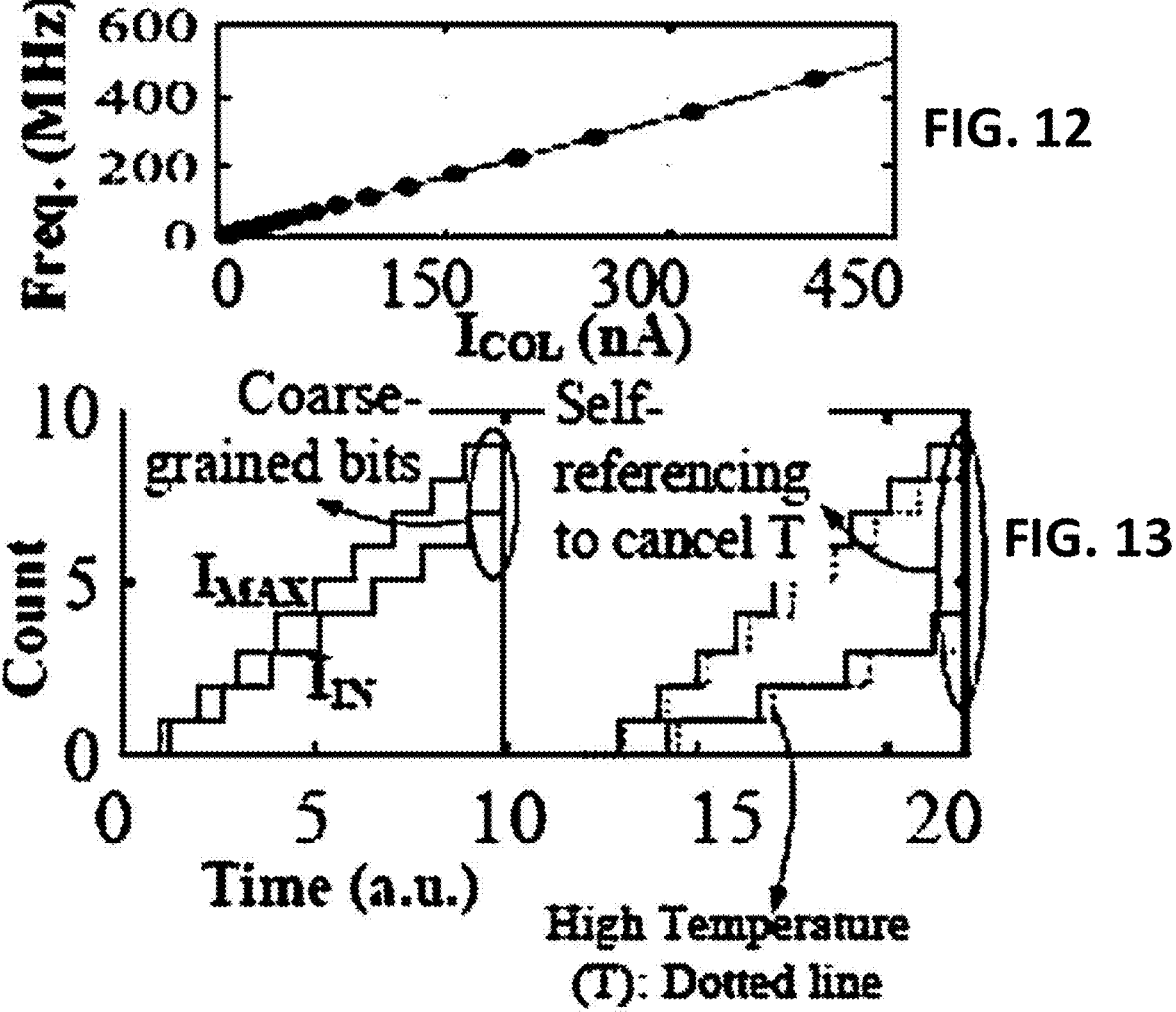
FIG. 12 is a plot of column current versus frequency of the CCO shown in FIG. 11 demonstrating its linearity over varying input column currents.
FIG. 13 is a plot of coarse-grained and fine-grained bit determination for bits output from the ADC shown in FIG. 3 in accordance with a representative embodiment.

FIG. 12 is a plot of column current versus frequency of the CCO 101 shown in FIG. 11 demonstrating its linearity over varying input column currents. In accordance with a representative embodiment, the replica paths in the CCO 101 shown in FIG. 11 implement a programmable input current subtraction from $I_{COL}$ using the select switches $S_N$. In FIG. 12, the plot shows that the ADC first operates in a coarse grained mode to determine the first few significant bits followed by current subtraction and fine-grained mode. A self-referencing algorithm performed by the self-referencing logic 103 converts a reference current $I_{REF}$ to digital bits $D_{REF}$ and converts an input current $I_{IN}$ to digital bits Dm. The self-referencing logic 103 also determines $D_{IN}/D_{REF}$ by successive approximation. FIG. 13 is a plot of coarse-grained and fine-grained bit determination for bits output from the ADC in accordance with a representative embodiment. FIG. 13 demonstrates that the self-referencing can cancel common-mode factors, such as temperature and aging. Self-referencing also calibrates replica paths in the CCO 101 shown in FIG. 11.

By closely knitting computing and storage in SRAM or other solid-state memory, the exemplary embodiment presents many interesting energy-speed-accuracy trade-offs. A lower $I_{REF}$ of DAC reduces the array biasing power during scalar product operations. However, at very low $I_{REF}$, the leakage current from the unselected columns affects the accuracy of the scalar product. Leakage from the unselected columns can be suppressed by under driving $BL_{P1}$ and/or increasing the threshold voltage of M1 and M2 in SRAM. Likewise, at very low $I_{REF}$, the thermal noise affects the accuracy of CCO 101. The thermal noise can be averaged out by running the CCO 101 longer and averaging the output, but results in reduced throughput. Similarly, other properties of the computing models can also optimize energy-speed-accuracy in the exemplary design. As discussed below, successive samples from the sampling layer can fall in the proximity. Since $W^i-W^{i-1}$ is likely small, it proportionally reduces the bias current from the DAC. Hence, computing $V\cdot(Wi-W^{i-1})$ to update from the previous scalar product $V\cdot W^{i-1}$ can reduce power. The level of sophistication in mixed-signal peripherals also depends on the impact of scalar product accuracy to the overall accuracy of BI. Using a cross-layer analysis allows the optimal complexity of the peripherals to be determined.

Figure 14:
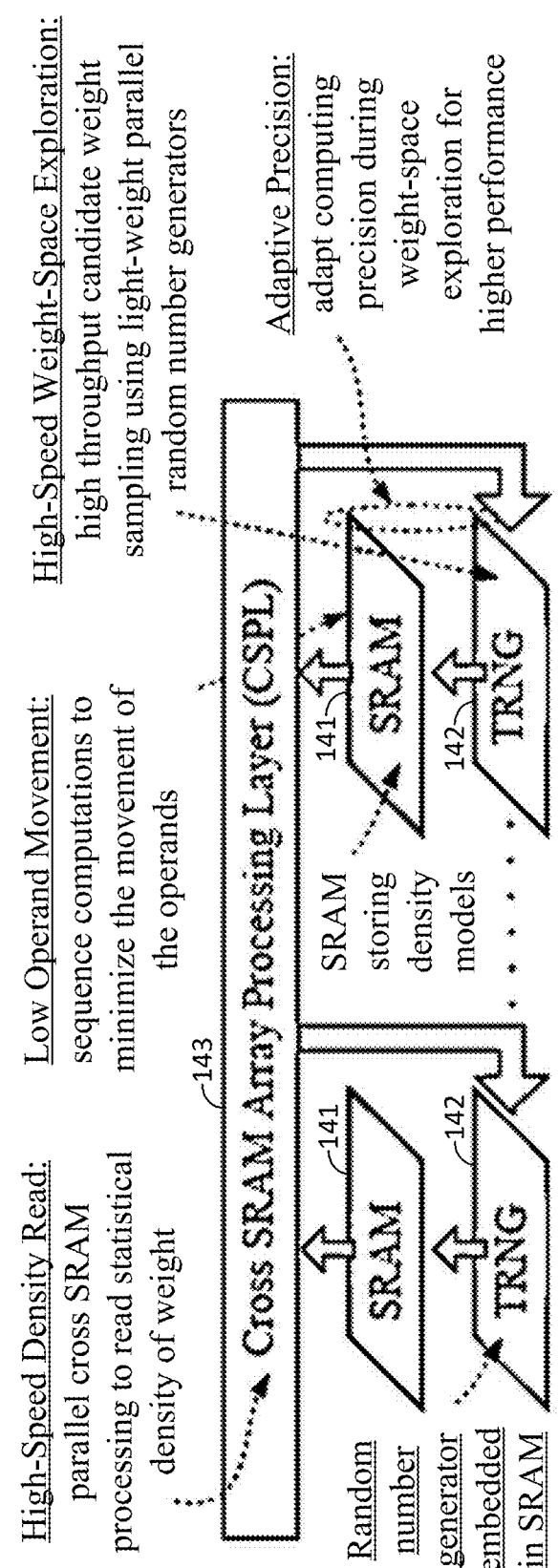
FIG. 14 is a block diagram of the ML system in accordance with a representative embodiment for achieving SRAM-based sampling and storage of weight densities with high throughput.

The memory platform in accordance with the exemplary embodiment addresses needs of the system relating to weight density storage and weight sampling (in FIG. 2, the bottom and middle layers). In accordance with the exemplary embodiment, SRAM is adapted with minimal overheads for a high-dimensional weight density storage and high-throughput weight sampling. FIG. 14 shows a block diagram of such an SRAM in accordance with an embodiment for performing SRAM-based weight density storage and sampling. The weight density can be approximated by GMMs. SRAM arrays 141 not only store the model parameters, but can also read the GMM density at a query weight sample. RNGs are embedded in the SRAM arrays 141 for a Markov chain weight sampling. A cross-SRAM array processing layer (CSPL) 143 combines density parameters from all SRAM arrays 141 to read the density of a candidate sample $w^{cand}$ generated by the RNGs 142. The CSPL 143 accepts or rejects $w^{cand}$ probabilistically depending on the sample's probability density. Accepted samples are passed to the computing layer for processing against input.

Key features of the exemplary embodiment include: (i) the design uses light-weight parallel RNGs 142 by sharing resources with the SRAMs of the SRAM arrays 141 for a high-throughput sampling; (ii) computations are precision adaptive and sequenced to minimize the movement of operands within the SRAMs of the SRAM arrays 141. (iii) Cross-SRAM processing parallelizes the density read and scales to high-dimensional densities.

Since the weight densities for BI can often be multi-mode, a Gaussian approximation is typically insufficient. Thus, exemplary embodiments constructed in accordance with inventive principles and concepts disclosed herein use GMMs to model the densities. GMMs are also prevalent in speech recognition and digital platforms to read GMM density. However, compared to speech, complexity of GMM in BI is much higher. The dimension of GMM in even a moderate scaled neural network is ~100 to 10,000 while speech applications typically use ~40-dimensional GMMs. Moreover, BI may require much higher throughput to read GMM density than speech applications where one frame is processed in ~20 ms. Hence, the known digital platforms are inadequate for GMM density reads in BI. Moreover, unlike known platforms, exemplary embodiments disclosed herein demonstrate a fundamentally different approach to read GMM density within the memory platform, such as SRAM, for storing the model parameters.

The primary challenge for storage and sampling of weight densities in BI within a memory platform, such as SRAM, is to be able to support both network scalability and flexibility of the density profiles. Since weights in a BI are statistically correlated, the dimension of the weight density is the same as the number of weights in the network. Flexibility of the density storage requires storing arbitrarily-shaped profiles. The challenges are addressed by first identifying the computing models that support flexibility and can also exist within the constraints of simplified memory cells, such as SRAM cells, and then, conforming SRAM to better accommodate the models. Specifically, GMMs can be employed to model the posterior density of weights. A GMM is simply a mixture of many Gaussian functions, where Gaussian functions with a diagonal co-variance are typically used for simplicity. Prior works have shown that the weight densities can be modeled by GMM using Variational Inference. Since the number of mixture functions is small (M~10), but each function is highly dimensional, computing density of each mixture function requires the majority of the computing effort. The density of a mixture Gaussian function N ($w^{cand}$; $\mu_i$, $\sigma_i$) depends on its exponent $$\varepsilon = \sum_{j=1}^{N} \left( \frac{(w_j^{cand} - \mu_{ij})}{\sigma_{ij}} \right)^2 .$$

Here, $w^{cand}$, $\mu_i$ and $\sigma_i$ are each N-dimensional.

Figure 15:
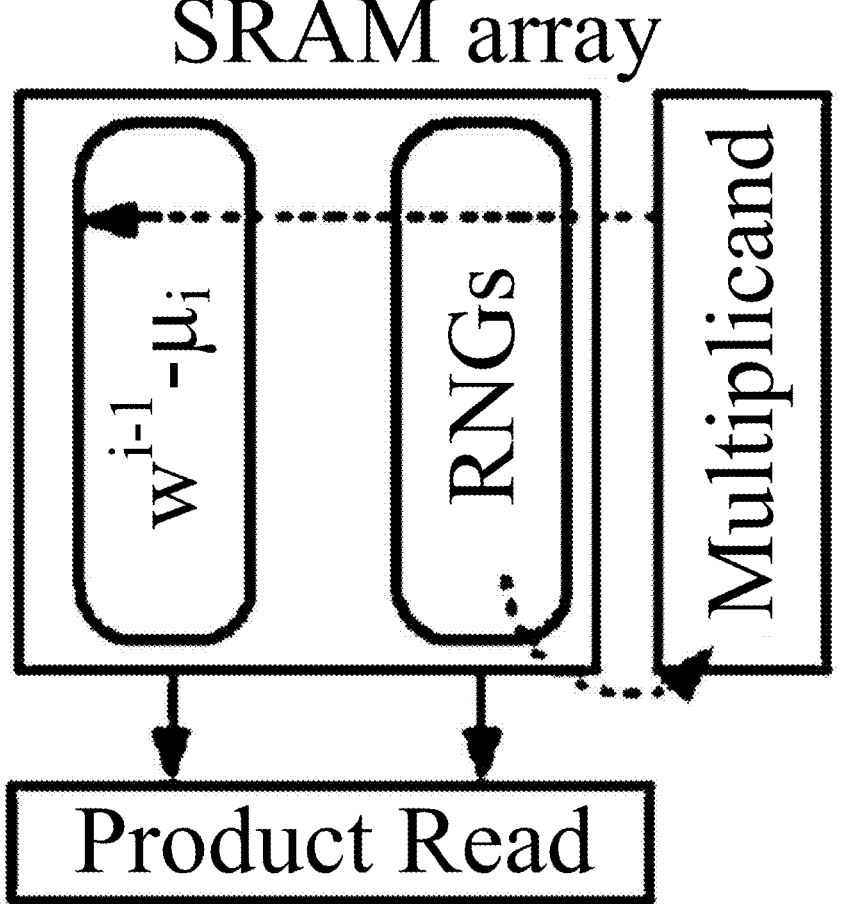
FIG. 15 is a flow diagram depicting mapping of Eq. 2 to an SRAM array.

FIG. 15 is a flow diagram depicting mapping of Eq. 2 an SRAM array. Note that e can be computed using the exemplary scalar product operation of the SRAM described above. However, $\varepsilon$ can be further simplified by exploiting the sampling property (discussed below) where $w^{cand}$ falls in the proximity of previous sample $w^{i-1}$. Thus, $\varepsilon_n$ at $w^{cand}$ can be computed from $\varepsilon_{n-1}$ at $w^{i-1}$ by $$\varepsilon_n = \varepsilon_{n-1} + \left( \frac{\mathcal{R}}{\sigma_i^2} \right) \cdot \mathcal{R} + 2 \times \left( \frac{\mathcal{R}}{\sigma_i^2} \right) \cdot (w^{i-1} - \mu_i).$$

Here, $\mathcal{R} = w^{cand} - w^{i-1}$ is a random vector generated by RNGs around $w^{i-1}$ and $$\frac{\mathcal{R}}{\sigma_i^2}$$

is a vector of element-wise multiplication of $\mathcal{R}$ and $1/\sigma_i^2$. Eq. (2) is computed by scalar product operation in a memory platform, such as SRAM. Arranging $\varepsilon_n$ as in Eq. (2) minimizes the operand movement in SRAM in FIG. 15 since only $\mathcal{R}$ evolves and $w^{i-1} - \mu_i$ is static until the sampling layer finds an output.

Figure 16:
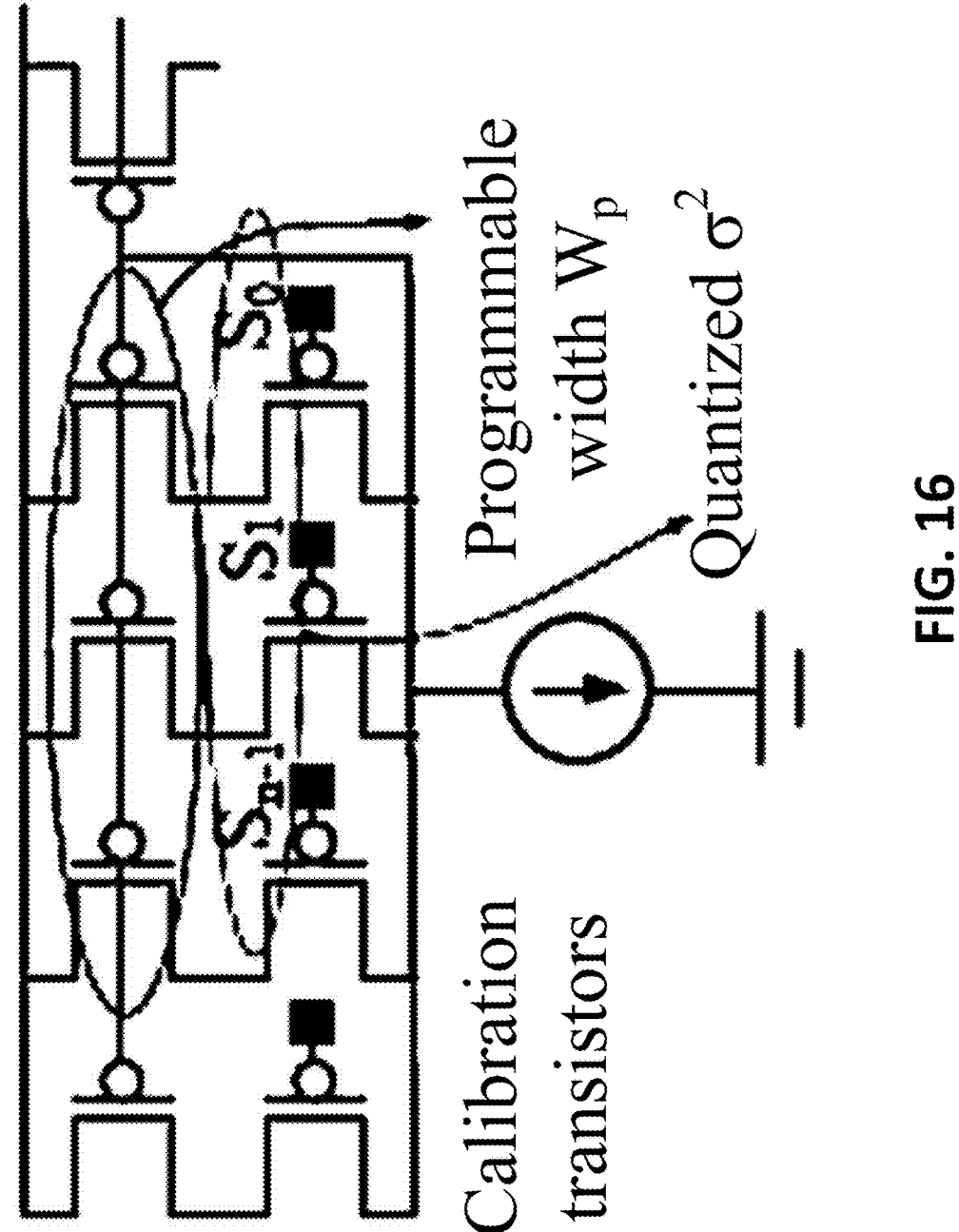
FIG. 16 is a schematic diagram of a modified DAC that utilizes a modulated reference current.

FIG. 16 is a schematic diagram of the DAC 133 shown in FIG. 3 modified to utilize a modulated reference current. The DAC 160 performs element-wise multiplication of $\mathcal{R}$ and $1/\sigma_i^2$ by modulating $W_P$ based on digitized $\sigma_i^2$. The earlier exemplary scheme also calibrates the added mirroring transistors here. The CSPL 143 shown in FIG. 14 reads all k arrays processing $w^{cand}$ to find the overall Exponent $$\varepsilon_n = \sum_{i=1}^{k} \varepsilon_n^j.$$

The overall GMM density in log-domain is computed from the Exponents of all mixture function using $\ln(e^a + e^b) = a + \ln(1 + e^{b-a})$ and look up table (LUT) for $\ln(1 + e^x)$.

Another challenge is to maintain a high throughput in the weight sampling layer since a BI considers many weight samples for an input. In accordance with an exemplary embodiment, Markov Chain (MC) weight sampling using Metropolis-Hastings (MH) is used in the weight sampling layer to maintain high throughput. MC sampling is more suited than rejection and importance sampling in a high-dimensional space. Among the other MC methods, MH finds the middle ground of search complexity and average random walk of the chain. The proposed setup can be extended to an exemplary embodiment of a more efficient gradient-based sampling, as discussed below in more detail.

To implement MC sampling within a suitable memory platform, such as SRAM, the memory array can be embedded with RNGs to generate a random vector R. The candidate weight sample $w^{cand}$ is defined as $\mathcal{R} + w^{i-1}$ from the past output $w^{i-1}$. CSPL 143 (FIG. 14) accepts $\mathcal{R}$ if GMM ($w^{cand}$)/GMM($w^{i-1}$) is more than U, where U is generated uniformly between zero and one. Since in a high-dimensional weight space many $\mathcal{R}$ end up being rejected, high-speed RNGs are preferred. RNGs are formed using the cross-coupled inverter pair technique. However, unlike conventional RNGs, in accordance with a preferred embodiment the RNGs are co-located within the SRAM array, as indicated in FIGS. 14 and 15, sharing peripherals to minimize overheads.

Figure 17:
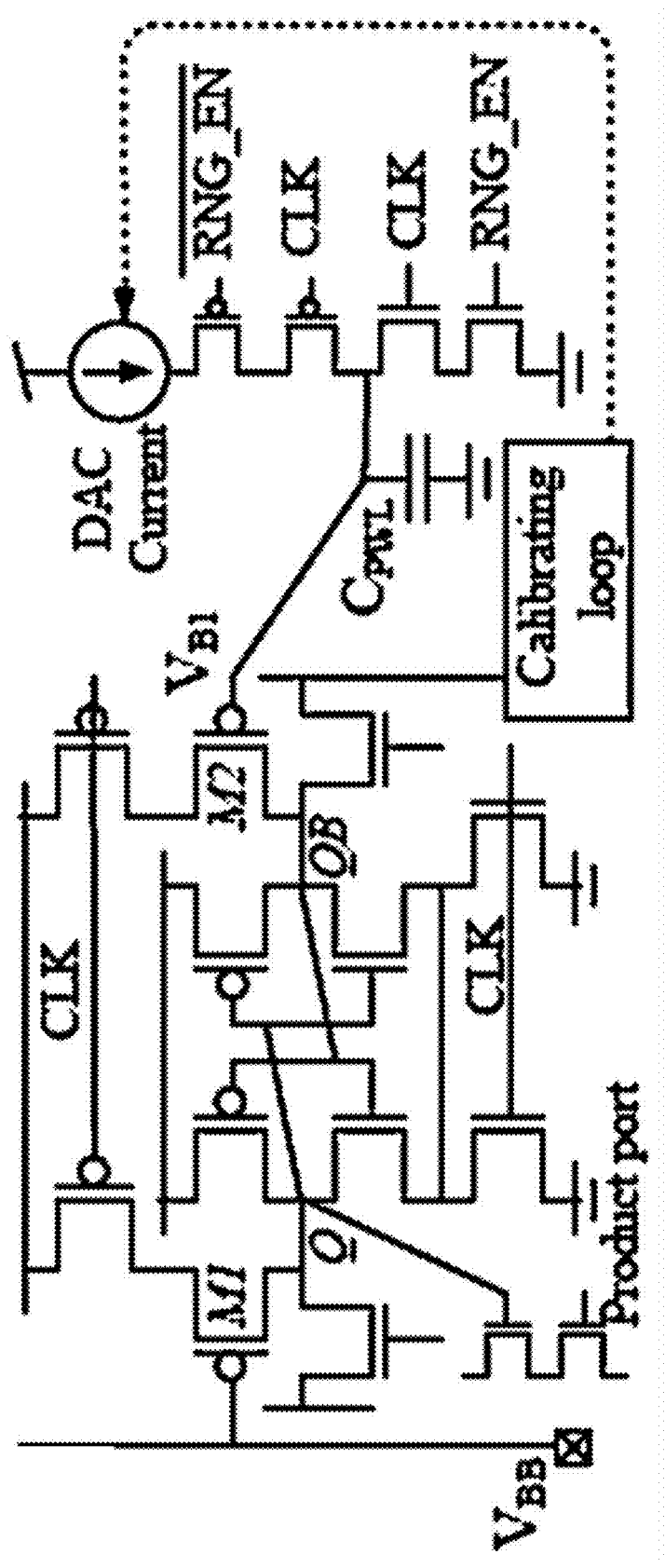
FIG. 17 shows a random number generator cell of the ML system in accordance with a representative embodiment.

FIG. 17 shows a schematic diagram of the RNG cell 170 based on cross-coupled inverters in accordance with an embodiment. The differential ends Q and QB are pre-charged to $V_{DD}$ when CLK=0. When CLK=1, the thermal noise resolves the meta-stability to generate a random bit. A programmable delay can be implemented in an exemplary embodiment using M1 and M2 to compensate for process variability/aging-induced bias in a random bit. The gate of M1 for all RNGs in a column can be connected and biased to $V_{BB}$. The potential at the gate of M2 in each cell can be generated using row DAC by pre-charging $WL_P$ capacitance at CLK=0. A suitable auto-calibration scheme can be incorporated into the system. For coarse-grained calibration, the RNG cells 170 can be repeatedly powered up by CLK signals, and a counter can determine the ratio of '0' to '1' over a long sequence. Based on the ratio determined by the counter, it increases or decreases the DAC current to modulate the gate voltage of M2 so that ones at QB are barely more than zeros. Fine-grained tuning can further balance the ratio of zeros and ones using smaller width calibration transistors. For MH sampling, the number of bits in R can be small since the search radius of MC sampling can be small. Therefore, data movement cost for R to the multiplicand buffer shown in FIG. 15 is small.

Figures 18, 19:
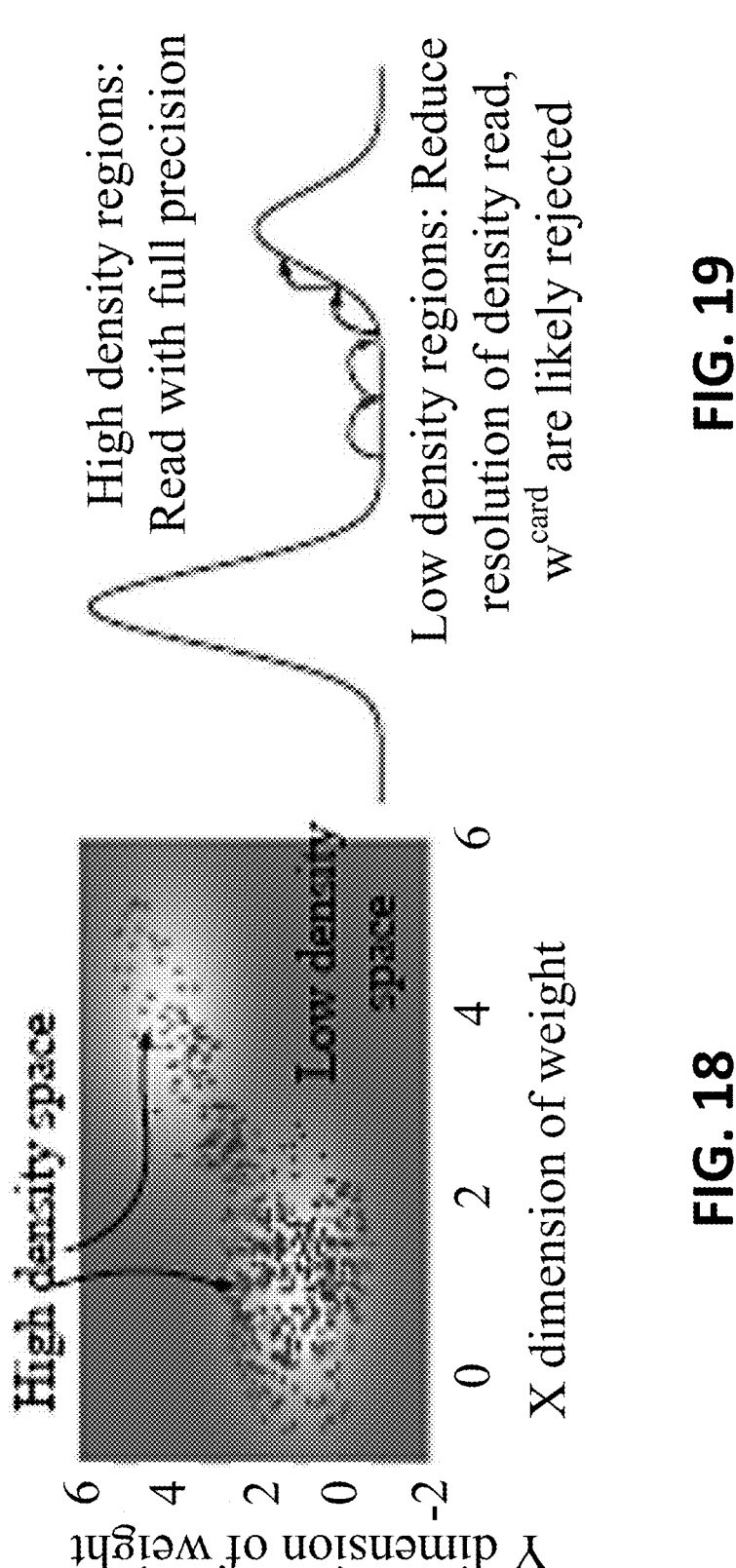
FIG. 18 shows an example sampling in the two-dimensional weight space by the ML memory system using fixed precision in accordance with a representative embodiment.
FIG. 19 shows the sampling results obtained using an exemplary adaptive precision in accordance with an embodiment, where the precision drops 1-bit after the CSPL shown in FIG. 14 fails to accept R in ten consecutive iterations.
Figures 20, 21:
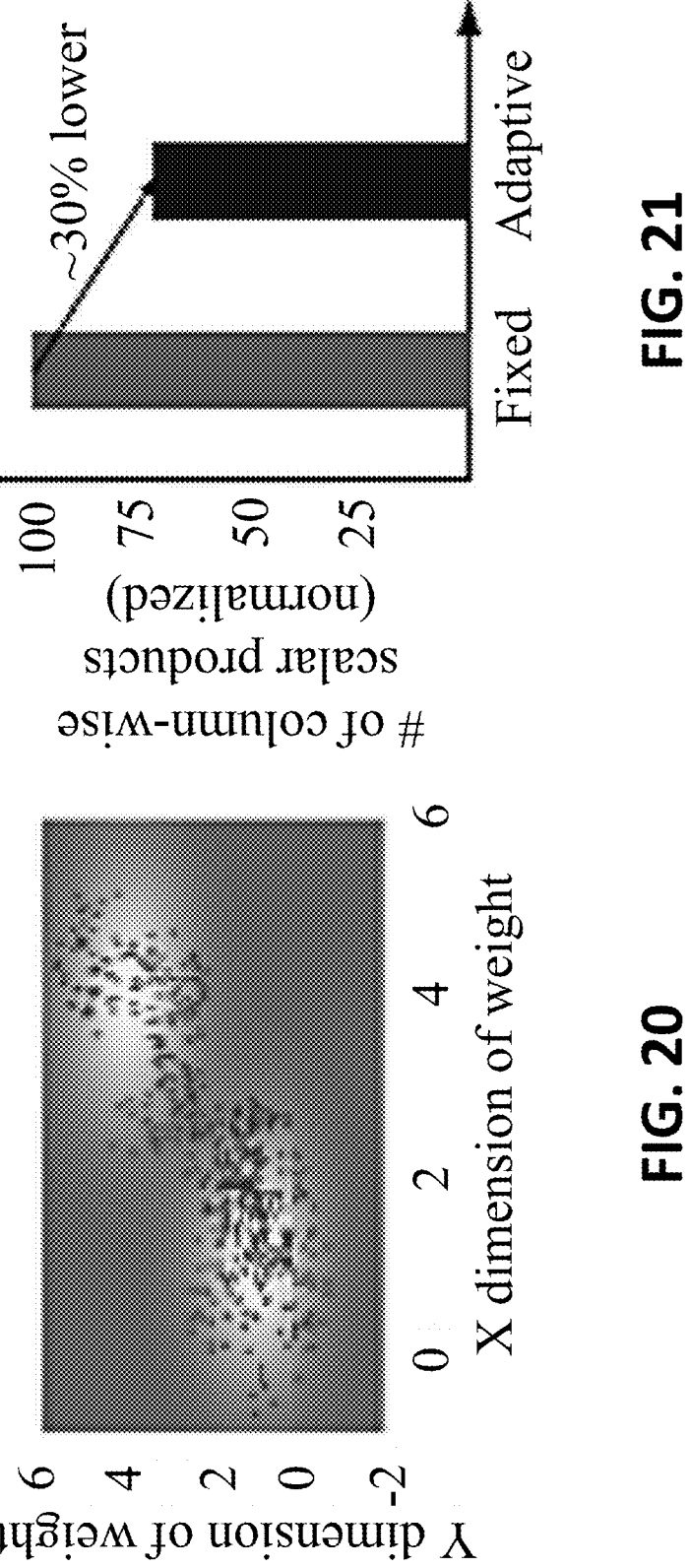
FIG. 20 shows an example sampling in the two-dimensional weight space by the ML memory system using adaptive precision in accordance with a representative embodiment.
FIG. 21 shows simulation results comparing adaptive precision with fixed precision and demonstrating that adaptive precision reduces the total number of operations that need to be performed.

FIG. 18 shows an example sampling in the two-dimensional weight space by the ML memory system using fixed precision in accordance with a representative embodiment. As MC chain wanders around in the low density space, many R will end up being rejected. Therefore, the computing effort can be minimized by adapting the operating precision. To this end, if log $(GMM(w^{i-1}))$–log$(GMM(w^{cand}))$ is large, CSPL 143 (FIG. 14) can drop the computing precision at the next iteration, since the MC chain is walking in the low density space. GMM density can be already computed in log-domain as discussed before. The precision can thus be adapted by various heuristics, such as decreasing by 1-bit if n consecutive R fail to be accepted, for example. In the preferred embodiment, a lower precision scalar product increases throughput by processing fewer SRAM columns. FIG. 19 shows the sampling results using an exemplary adaptive precision in accordance with an embodiment, where the precision drops 1-bit after CSPL 143 fails to accept R in ten consecutive iterations. FIG. 20 shows an example sampling in the two-dimensional weight space by the ML memory system with adaptive precision in accordance with a representative embodiment. Comparing FIGS. 18 and 20 shows that adaptive precision is as effective as the fixed precision, but advantageously can reduce the total number of operations. FIG. 21 shows simulation results comparing adaptive precision with fixed precision and demonstrating that adaptive precision reduces the total number of operations that need to be performed.

The following discussion identifies the parameters of interaction among storage, sampling, and computing layers of BI in the exemplary SRAM at the system-level, and statically and dynamically optimizes the efficiency of cross-array and cross-layer operations. In the exemplary embodiments the intertwined layers of BI present optimization opportunities at all physical design, operating power, mapping, and architecture levels.

The goal of the physical design and operating power space optimization of the exemplary embodiments is to minimize area/power of the overall system while retaining a high fidelity and flexibility of BI. Closely-knit storage, sampling, and computing layers in the exemplary SRAM compete for the physical area, operating power, accuracy, and performance. At the SRAM cell level, embodiments configured with a lower cell area have improved storage efficiency, but can affect the energy efficiency of computing. At lower cell area, leakage in SRAM cells results in higher variability. Therefore, to guard-band against the cell leakage, the bias current for scalar product increases. At the SRAM array level, exemplary larger array designs reduce power/area overheads due to peripherals. A larger SRAM array, however, also presents more leakage paths. Robustness of mixed signal peripherals requires calibration, albeit storing calibration bits for each DAC reduces the effective memory utilization. At the system level, parallel copies of CSPL 143 improve throughput, but compete for power/area with exemplary SRAM arrays.

In summary, the physical design and operating power space of the three layers preferably are complex, intertwined, and optimized for the various embodiments according to the principles set forth herein. The contention for area/power among layers can be mitigated by dynamic and spatial adaptations. For example, $I_{REF}$ can adapt to the process corner of an exemplary SRAM array. The process corner can be learned by sensing its leakage current through an ADC. Similarly, $I_{REF}$ can adapt to dynamic variations in temperature. System-level design studies can also determine the efficacy of one design approach over another.

Figures 22, 23:
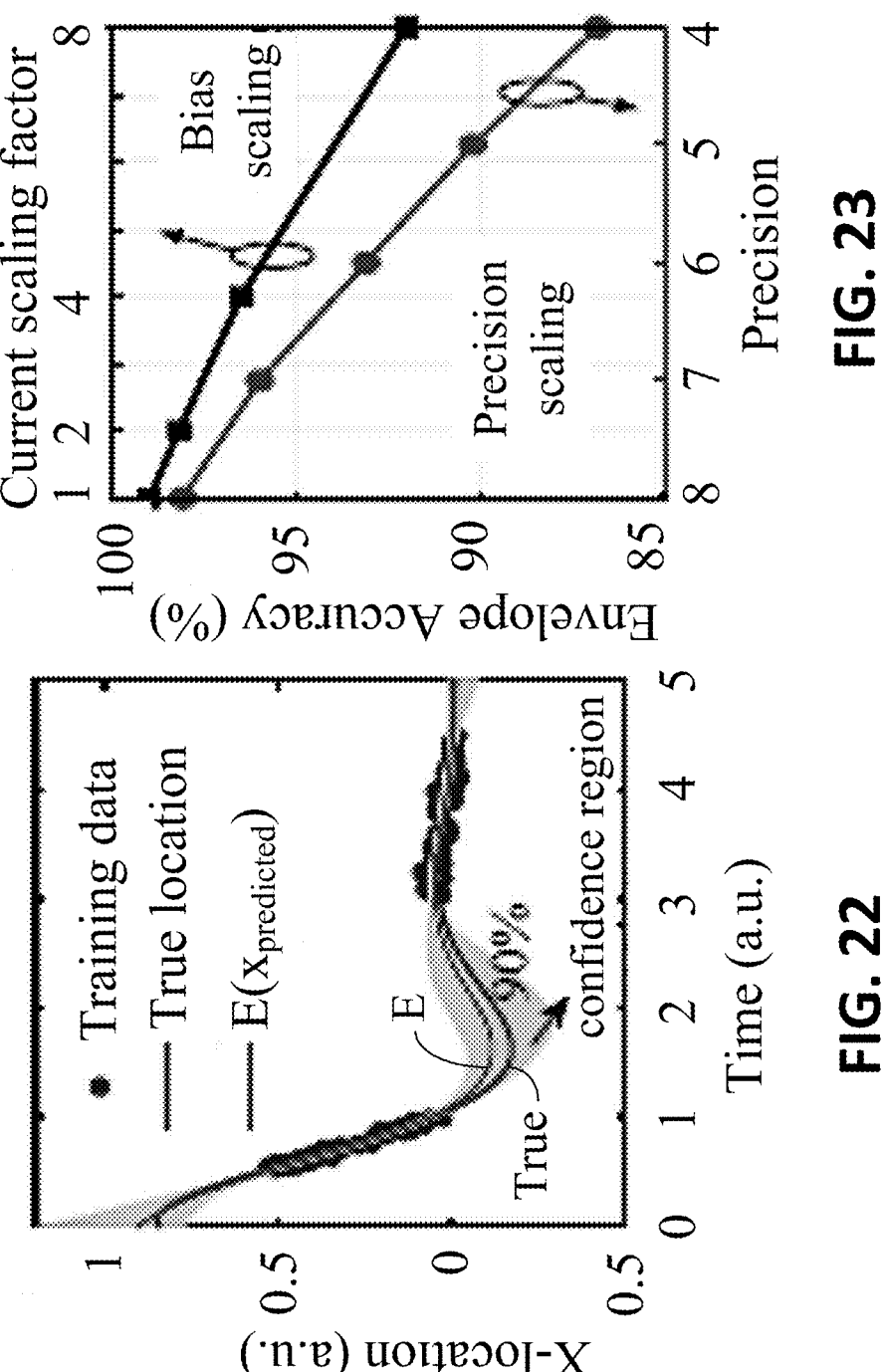
FIG. 22 is a plot showing the true trajectory of a particle and training data concentrated in two specific regions and the predicted results achieved by lowering precision and by lowering $I_{REF}$ in DACs when using BI in a network.
FIG. 23 is a plot showing simulation results that compare root-mean-square (RMS) error in the predicted 90% confidence envelope for lowered precision and lowered IREF against the functional simulations depicted in FIG. 22.

For example, consider a small-scale regression problem illustrated in FIG. 22, which shows the true trajectory of a particle and training data concentrated in two specific regions. FIG. 22 also shows the predicted results using BI in a network with one hidden layer of three neurons. First, it should be noted that BI aptly expresses a lower confidence on prediction in the regions where sufficient training data is not available. Now, consider the two approaches for power scaling: (i) lowering precision and (ii) lowering $I_{REF}$ in DACs. Using both approaches, simulation results shown in FIG. 23 compare root-mean-square (RMS) error in the predicted 90% confidence envelope of (i) and (ii) against functional simulations depicted in FIG. 22. In FIG. 22, it can be seen that lowering precision from 8-bit to 4-bit precision reduces the prediction accuracy to 87%. Meanwhile, lowering $I_{REF}$ by 8× reduces accuracy to 93%. Therefore, (ii) is more effective.

Figure 24:
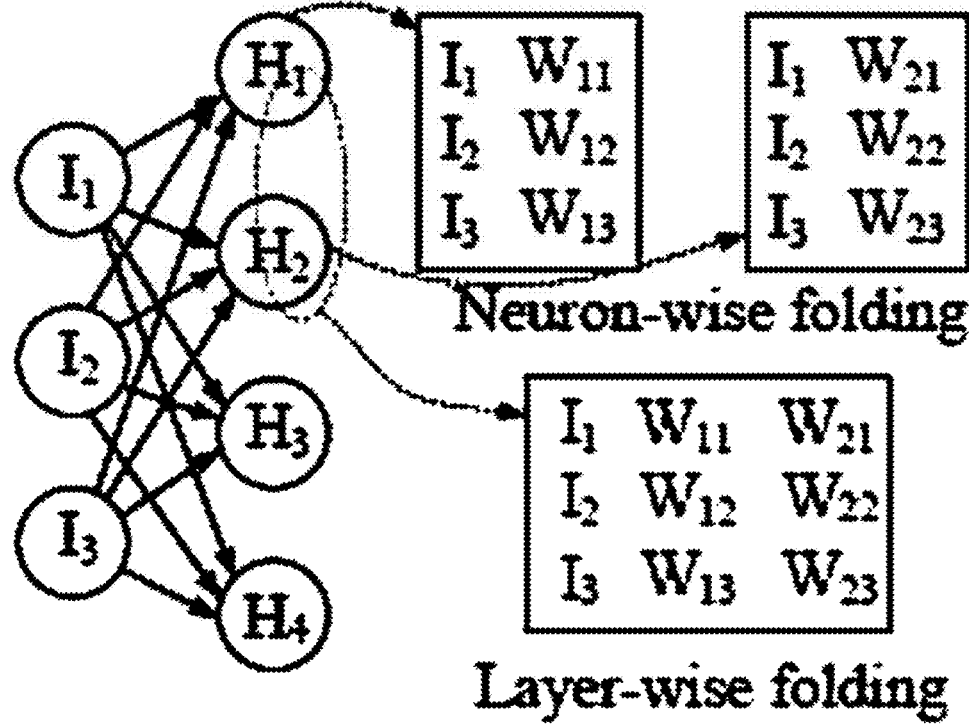
FIG. 24 shows mapping of neurons onto SRAM using neuron-wise folding and layer-wise folding.

In accordance with an exemplary embodiment, neuron placement is also optimized in the exemplary memory platforms. A mapper can determine the placement of different neurons on exemplary SRAM arrays. The mapper's goal is to optimize the neuron placement for the highest memory utility and minimum data transfer latency/power. Since the data-flow in neural networks is static, such optimization can be predetermined. Larger size neurons and layers should be folded to map arbitrary-sized neural networks on exemplary SRAM arrays. This presents two exemplary design choices—neuron-wise and layer-wise folding—shown in FIG. 24. A neuron-wise folding maps each neuron onto one or many exemplary SRAM arrays. A layer-wise folding concatenates all weights of a layer and maps the complete layer on one or many SRAM arrays. In FIG. 24, neuron-wise folding poorly utilizes storage space since multiple copies of input to a layer are stored for each neuron during computing. Meanwhile, layer-wise folding has to execute neurons sequentially, and hence has a higher latency. BI also presents some interesting differences such as hidden/output layers that are more dynamic than input layer due to both input and weights evolving in the layers.

Figure 25:
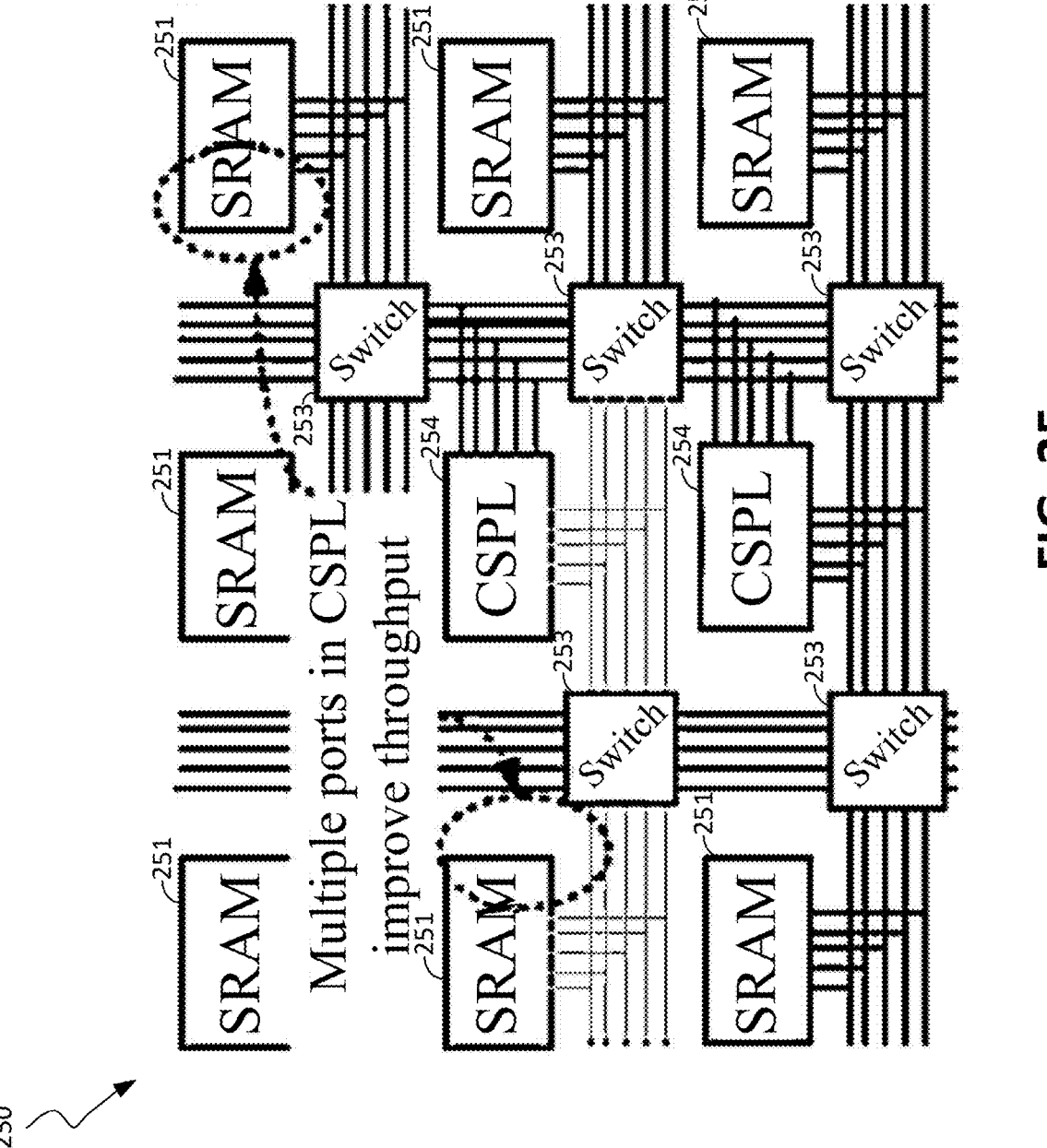
FIG. 25 is a block diagram of the ML memory system in accordance with a representative embodiment in which two parallel CSPLs are used to reduce communication latency.

FIG. 25 is a block diagram of the ML memory system 250 in accordance with a representative embodiment. Examining such unique considerations in BI, integer programming problems can be framed to determine an efficient mapping of neurons on the exemplary SRAMs 251. Moreover, optimal placement of neurons also depends on architectural considerations, such as the number of ports or parallel instances of CSPL 254 as shown in FIG. 25. Using an optimal mapping, in FIG. 25, two parallel CSPL reduce communication latency for 50 arrays by ~30%, as indicated by the plot shown in FIG. 26.

Additionally, the sampling mode of the memory system can be optimized. The sampling layer shown in FIG. 2 presents a non-deterministic delay depending on MC operating region. Runtime dynamic optimization of sampling mode can be explored to minimize the delay. An adaptive precision to curtail power/delay during sampling was set forth above. Similarly, a search radius of sampling can be dynamically adapted, in accordance with the principles herein. Moreover, the MC mode itself can be modulated to cover low density spaces rapidly. Compared to MH, a gradient-based Hamiltonian Monte Carlo (HMC) sampling can minimize the random-walk of MC, but each iteration is more expensive in HMC than in MH. HMC requires similar elementary computations, reading posterior density and accepting samples probabilistically (just like MH), along with the density gradient and momentum variable updates.

Figures 26, 27:
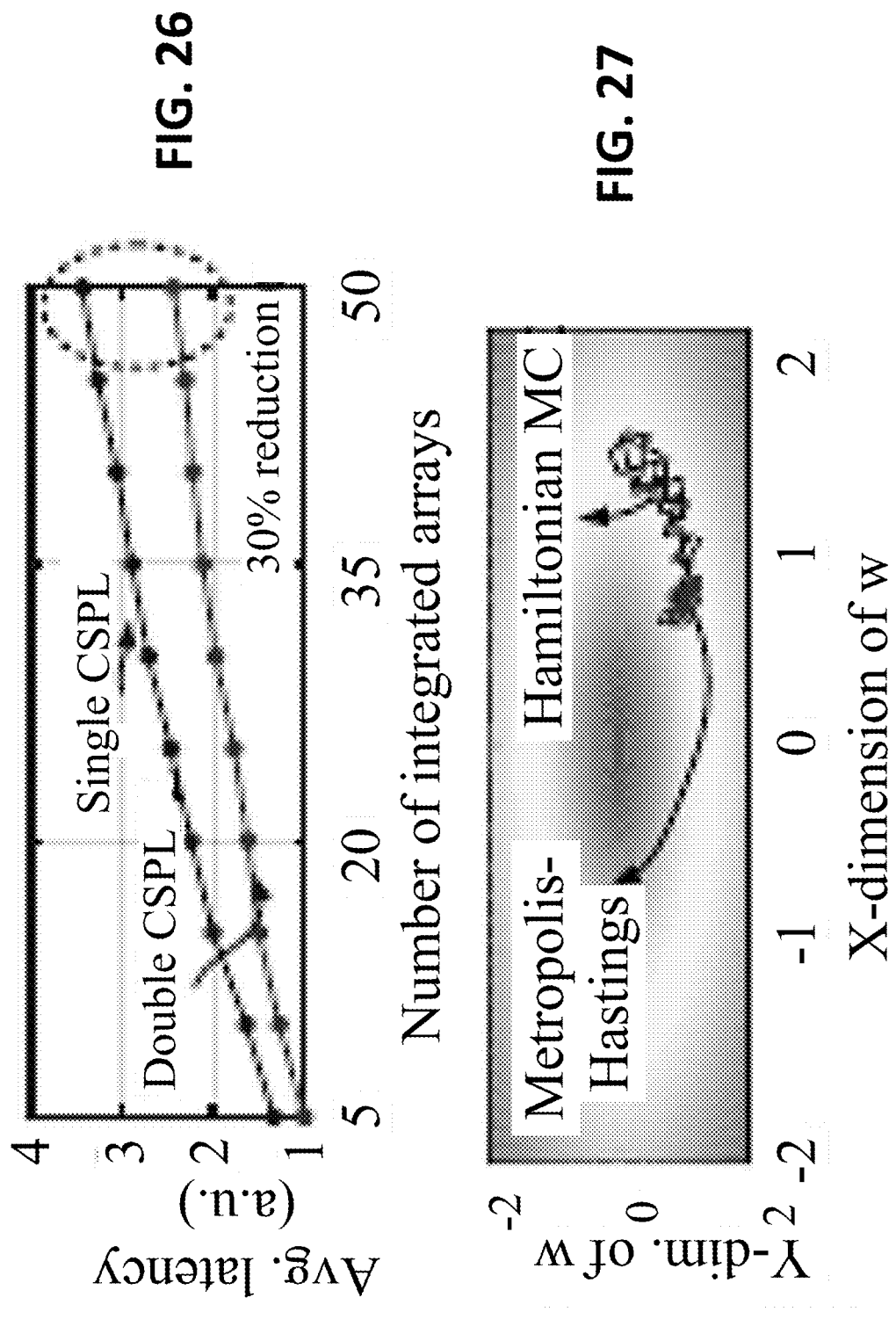
FIG. 26 is a plot comparing communication latency resulting from using a single instance of CSPL and a double instance of CSPL.
FIG. 27 is a plot of Markov Chain (MC) weight sampling simulations using Metropolis-Hastings (MH) vs. Hamiltonian Monte Carlo (HMC) sampling for two dimensions of w for the same number of samples.

The additional operations in HMC are also feasible within the modified exemplary SRAM disclosed herein. The gradient can be computed numerically from the density using Euler's method. Momentum variable can be updated by addition to the gradient. FIG. 27 is a plot of MH vs. HMC random walk for two dimensions of w and compares MH to HMC for the same number of samples. The simulations assume a low precision (6-bit) gradient. HMC can cover the weight density space quicker than MH. Exploring the dynamic optimization space, the optimal runtime heuristics can be determined using CSPL 143, which can adapt precision and search radius and switch sampling mode between HMC and MH, given they present trade-offs for random walk and complexity of each iteration.

The inventive principles and concepts are also directed to a method for performing ML in a memory system is also provided. FIG. 28 is a flow diagram representing the method in accordance with an embodiment. In accordance with this embodiment, the method comprises performing an ML algorithm in a memory system comprising a solid-state memory system, which comprises an array or memory cells and one or more peripheral devices. The ML algorithm receives a multi-bit precision input, V, and parameters associated with weight density of a neural network, as indicated by block 281. The ML algorithm causes the solid-state memory system to process the weight density parameters to generate weight samples, W, as indicated by block 282. The ML algorithm causes the multi-bit precision input V to be stored in the peripheral device(s) and the weight sample W to be stored in the memory cells, as indicated by block 283. The ML algorithm causes the memory system to process the weight samples W and input V to compute a multi-bit precision scalar product, as indicated by block 284.

It should be noted that the inventive principles and concepts have been described with reference to representative embodiments, but that the inventive principles and concepts are not limited to the representative embodiments described herein. Although the inventive principles and concepts have been illustrated and described in detail in the drawings and in the foregoing description, such illustration and description are to be considered illustrative or exemplary and not restrictive; the invention is not limited to the disclosed embodiments. Other variations to the disclosed embodiments can be understood and effected by those skilled in the art, from a study of the drawings, the disclosure, and the appended claims.

What is claimed is:

1. A memory module system for a high-dimensional weight space neural network configured to process machine learning data streams comprising:
   a memory module comprising a static random access memory (SRAM) array and a cross-SRAM processing layer, the SRAM array comprising an array of SRAM cells, multiplexer, analog-to-digital converter (ADC) and multiplicand buffer, the memory module with embedded random number generators (RNGs) within the memory module, where the SRAM array is configured for scalar product computation to determine statistical density storage;
   the memory module configured to store neural network weights, sample the neural network weights, and compute one or more scalar product using the sampled neural network weights and one or more corresponding applied inputs, where the memory module adapts operating precision to optimize computing effort based on available weight space and application specifications; and
   transform the one or more scalar product into an output signal.

2. The memory module system of claim 1, further comprising at least one scalar product port.

3. The memory module system of claim 1, wherein the memory module is incorporated in an edge processing device.

4. The memory module system of claim 1, further comprising at least one peripheral digital to analog converter (DAC) operatively connected to the multiplicand buffer and to a row current of the SRAM array, wherein the row current provides a current-mode AND gate for the DAC.

5. The memory module system of claim 4, wherein Gaussian mixture model (GMM) density computations are mapped onto the SRAM array.

6. The memory model system of claim 3, wherein Gaussian mixture module (GMM) density computations are mapped onto an integrated memory array (IMA) of the edge processing device.

\* \* \* \* \*